US007006689B2

(12) United States Patent
Kasutani

(10) Patent No.: US 7,006,689 B2
(45) Date of Patent: Feb. 28, 2006

(54) IMAGE SEARCH SYSTEM AND IMAGE SEARCH METHOD THEREOF

(75) Inventor: Eiji Kasutani, Tokyo (JP)

(73) Assignee: NEC Corporation, Tokyo (JP)

( * ) Notice: Subject to any disclaimer, the term of this patent is extended or adjusted under 35 U.S.C. 154(b) by 630 days.

(21) Appl. No.: 10/010,840

(22) Filed: Dec. 5, 2001

(65) Prior Publication Data

US 2002/0110276 A1    Aug. 15, 2002

(30) Foreign Application Priority Data

Dec. 12, 2000    (JP)    ............................. 2000-378023

(51) Int. Cl.
 *G06K 9/00*    (2006.01)
(52) U.S. Cl. ...................... 382/165; 382/191; 382/250; 382/305; 375/240.2; 707/3
(58) Field of Classification Search ................ 382/165, 382/166, 191, 250, 299, 305; 375/240.18, 375/240.19, 240.2, 240.21, 240.24; 707/4, 707/104.1, 3
See application file for complete search history.

(56) References Cited

U.S. PATENT DOCUMENTS

| | | | | |
|---|---|---|---|---|
| 5,579,471 | A | * | 11/1996 | Barber et al. ............... 715/700 |
| 5,802,361 | A |   | 9/1998 | Wang et al. |
| 5,852,670 | A | * | 12/1998 | Setlak et al. ................. 382/126 |
| 6,104,434 | A | * | 8/2000 | Nakagawa et al. .... 375/240.16 |
| 6,141,441 | A | * | 10/2000 | Cass et al. ................... 382/166 |
| 6,157,741 | A | * | 12/2000 | Abe et al. .................... 382/233 |
| 6,526,400 | B1 | * | 2/2003 | Takata et al. ................... 707/3 |
| 6,584,223 | B1 | * | 6/2003 | Shiiyama .................... 382/173 |

(Continued)

FOREIGN PATENT DOCUMENTS

EP    0 643 358 A2    3/1995

(Continued)

OTHER PUBLICATIONS

Tao B. et al., "Image Retrieval With Templates of Arbitrary Size", SPIE, vol. 3022, pp. 2-11 (Feb. 13, 1997) Pentland et al., "Photobook: Content-Based Manipulation of Image Databases", International Journal of Computer Vision, vol. 18, No. 3, pp. 233-254 (1996).

(Continued)

*Primary Examiner*—Bhavesh M. Mehta
*Assistant Examiner*—Yubin Hung
(74) *Attorney, Agent, or Firm*—Scully, Scott, Murphy & Presser

(57) ABSTRACT

An image search system for determining a similarity of an image whose feature are represented by either one of image features amounts, a color distribution features or a frequency distribution features, to search for a similar image, including a to-be-searched image features storage unit for referring to data of an image features amount of each image to be searched, an inquiry image features input unit for receiving input of data of an image features amount of an inquiry image, a data processing unit for converting a kind of an image features amount of an image set to be an object whose kind of image features amount is to be changed to make a kind of image features amount of each image to be searched and a kind of image features amount of the inquiry image be coincident with each other, and a similarity calculation unit for comparing the image features amount of the inquiry image and the image features amount of each image to be searched based on the converted image features amount and determining a similarity of each image to search for a similar image.

22 Claims, 12 Drawing Sheets

U.S. PATENT DOCUMENTS 6,633,685 B1 * 10/2003 Kusama et al. ............. 382/284
6,804,683 B1 * 10/2004 Matsuzaki et al. ....... 707/104.1

FOREIGN PATENT DOCUMENTS

| EP | 0 947 937 A2 | 10/1999 |
| EP | 1 018 688 A2 | 7/2000 |
| JP | H7-073195 | 3/1995 |
| JP | 09-237343 | 9/1997 |
| JP | H9-330407 | 12/1997 |
| JP | 11169568 A * | 6/1999 |
| JP | 11-316819 | 11/1999 |
| JP | 2000-259832 | 9/2000 |
| JP | 2002-82985 | 3/2002 |

OTHER PUBLICATIONS

Patent Abstract of Japan, vol. 1998, No. 01 (Jan. 30, 1998) & JP 09 237343A.

* cited by examiner

IMAGE SEARCH SYSTEM AND IMAGE SEARCH METHOD THEREOF

BACKGROUND OF THE INVENTION

1. Field of the Invention

The present invention relates to image search for searching for an image similar to a designated image based on the determination of similarities of an individual image and, more particularly, to an image search system for, even when feature of an image are represented by a different scheme, determining similarities of the image and searching for a similar image based on an image features amount according to each scheme, an image search method thereof and a storage medium which stores an image search program.

2. Description of the Related Art

With feature of an image made into data and represented by an image features, image search has been conventionally conducted by determining similarities of each image using the image features and searching for a similar image (e.g. from among accumulated images), for which devices and computer programs have been developed These conventional image search techniques adopt a method of searching for a similar image mainly by using an feature which represents constituent of colors contained in an image (hereinafter referred to as color constituent features) to find similarities of the color constituent.

Here, the color constituent features denotes an image features expressing color constituent of the image, by a representative color in the image and a constituent rate of the same, etc. and it can be also expressed by a frequency rate of each color contained in the image, or one or a plurality of representative colors and its or their color constituent rates, etc.

The system using a color constituent features, however, has a problem that it is impossible to reflect structural feature of an image such as a shape and a positional relationship of objects in the image.

Here, one example of conventional techniques for reflecting structural feature that an image has is disclosed in Japanese Patent Laying-Open (Kokai) No. Heisei 11-316819. The conventional technique recited in Japanese Patent Laying-Open (Kokai) No. Heisei 11-316819 proposes a method of calculating a color constituent features contained in each block which is obtained by dividing an image into a plurality of blocks and using a set of values of the color constituent features of the respective blocks as a color distribution features for the determination and search of similarities. Since a color constituent features of each block is expressed in the color distribution features, structural feature of an image can be reflected in the determination of similarities.

Disclosed in Japanese Patent Laying-Open (Kokai) No. 2000-259832 as another conventional method is the image search system using, as an image features, the frequency distribution features which represents a color arrangement of an image by a frequency region.

Here, the frequency distribution features of an image denotes an image features which represents an energy of each band that is obtained by dividing a frequency distribution of a spectrum of a color (mean color) of an image into a plurality of bands and analyzing a frequency.

FIG. 11 is a block diagram showing a structure of a main part of the image search system disclosed in Japanese Patent Laying-Open (Kokai) No. 2000-259832. The conventional image search system includes an image features generation unit 102 for generating a frequency distribution features 103 from applied image data 101, a frequency distribution features storage unit 104 for storing a frequency distribution features of an image to be searched in advance, and a similarity calculation unit 106 for calculating a similarity 107 using the frequency distribution features 103 of the applied image and an feature 105 stored in the frequency distribution features storage unit 104. Here, the image features generation unit 102 includes a reduced image generation unit 110 for generating a reduced image 111 from the image data 101, a frequency analysis unit 112 for conducting frequency analyses of the generated reduced image 111, and a DC component and partial AC component extraction unit 114 for extracting a DC component and partial AC component as the frequency distribution features 103 from among the frequency analysis unit 112 and an orthogonal conversion coefficient 113.

As introduced in "Text of WD 4.0 of MPEG-7 Visual" (ISO/IEC JTC 1/SC29/WG11 N3522), one example for color distribution features could be a combination of the Grid Layout Descriptor and any of the Dominant Color, Color Structure and Scalable Color, and for frequency distribution features the Color Layout Descriptor is a typical example.

As described in the foregoing, among examples of an image features are a color constituent features, a color distribution features and a frequency distribution features, use of which realizes determination of similarities of an image and image search.

Other conventional technique is disclosed in Japanese Patent Laying-Open (Kokai) No. Heisei 09-237343 proposes an image search system which in combination uses, a color histogram as a color constituent features among the above-described image features amounts, and an orthogonal conversion coefficient as a frequency distribution features.

FIG. 12 is a block diagram showing a main part of the image search system disclosed in Japanese Patent Laying-Open (Kokai) No. Heisei 09-237343. The conventional image search system includes an input device 201 for receiving input of an image features, an image features storage unit 202 for storing an image features and a similarity calculation unit 203 for calculating a similarity between the image features applied through the input device 201 and the image features stored in the image features storage unit 202.

The image features storage unit 202 includes an orthogonal conversion coefficient storage unit 204 for storing a frequency distribution features of an image and a color histogram storage unit 205 for storing color constituent information.

The similarity calculation unit 203 includes an image features determination unit 206, a color histogram similarity calculation unit 207 and an orthogonal conversion coefficient similarity calculation unit 208. The image features determination unit 206 determines whether an image features 209 applied through the input device 201 represents color histogram information or an orthogonal conversion coefficient. When the image features determination unit 206 determines that the amount represents color histogram information, the color histogram similarity calculation unit 207 calculates a similarity 212 between an image features 210 composed of color histogram information which is output from the image features determination unit 206 and color histogram information 211 read from the color histogram storage unit 205. The orthogonal conversion coefficient similarity calculation unit 208 calculates a similarity 215 between an image features 213 composed of orthogonal conversion coefficients which is output from the image features determination unit 206 and an orthogonal conversion coefficient 214 read from the orthogonal conversion coefficient storage unit 204 when the image features determination unit 206 determines that the amount represents an orthogonal conversion coefficient.

Since for the system to conduct image search when a plurality of kinds of image features exist, it requires an image features amount data base and a similarity calculation means corresponding to an feature of an inquiry image, as many similarity calculation means and image features amount data bases as the number of kinds of image features should be provided, which makes the system complicated and manufacturing costs higher.

In order to solve the problem, a conventional image search system which realizes image search by a simple device structure even when image search is conducted using both a color constituent features and a frequency distribution features is proposed.

In the image search system, in a case where a device is internally provided with only a frequency distribution similarity calculation means, when an feature of an inquiry image or an image to be searched is a color constituent features, a mean color is calculated from the color constituent features and converted into a frequency distribution features to conduct similarity calculation based on the frequency distribution features.

On the other hand, in a case where the device is internally provided with only a similarity calculation means for a color constituent features, when an feature of an inquiry image or an image to be searched is a frequency distribution features, the image is restored by inversely converting the frequency distribution features and then color constituent information of the restored image is extracted to conduct similarity calculation based on the obtained color distribution features.

In a case where the system is provided with only a similarity calculation means for a frequency distribution features, when an feature of an inquiry image or an image to be searched is a color constituent features, a mean color is calculated from the color constituent features and the mean color is converted to a DC component of a frequency distribution features, thereby conducting similarity calculation based on the obtained frequency distribution features.

As a result, determination and search of similarities of an image whose feature is represented as a color constituent features or a frequency distribution features can be executed only by the provision of a similarity calculation means for either one of the kinds.

However, no method of alternately converting an image features has been realized between a color distribution features representing an image features which has an image structural feature and a frequency distribution features.

As described above, the conventional devices have the following problems.

First, since an image features indicative of feature of an image has various kinds, for the comparison and search of images, an image features of a kind common to both images to be compared (searched) should be prepared for the images.

In addition, even when an image features amount of a kind common to both the images is provided, a function of conducting comparison and search based on the image features should be further provided in an image search system. For the image search system to realize comparison and search based on various kinds of image features amounts such as an amount of distribution feature and a frequency distribution features, it should be provided with a similarity calculation means based on each kind of image features amount, resulting in making the device complicated and increasing manufacturing costs.

Secondly, conventional devices are incapable of comparing images whose features are represented by a color distribution features and a frequency distribution features, respectively. This is because alternate level conversion technique in practical use has not been realized between a color distribution features and a frequency distribution features.

For example, in a case where an image features of an inquiry image is a frequency distribution features, it is impossible to search a data base which records a color distribution features of an image to be searched to find an image similar to the inquiry image.

SUMMARY OF THE INVENTION

An object of the present invention is to solve the above-described shortcomings of conventional art and to provide an image search system enables a simple device structure to realize comparison and search of each image whose feature is represented as a color distribution features or a frequency distribution features without deteriorating search performance, an image search method thereof and a storage medium which stores an image search program.

Another object of the present invention is to solve the above-described shortcomings of the conventional art and to provide an image search system realizing comparison and search of each image regardless whether an image features of the image is a frequency distribution features of the image or a color distribution features of the same, an image search method thereof and a storage medium which stores an image search program.

According to one aspect of the invention, an image search system for determining a similarity of an image whose feature are represented by either one of image features amounts, a color distribution features or a frequency distribution features, to search for a similar image, comprises means for converting, with respect to an image set to be a target whose kind of image features amount is to be changed among respective images to be searched and an inquiry image, a kind of image features amount of the image in question to make kinds of image features amounts of each the image to be searched and the inquiry image coincident with each other, and means for comparing the image features amount of the inquiry image with the image features amount of each the image to be searched based on the converted image features amount and determining a similarity of each image to search for a similar image.

In the preferred construction, the image search system further comprises means for referring to data of the image features amount of each the image to be searched, and means for receiving input of data of the image features amount of the inquiry image.

In another preferred construction, the image search system further comprises frequency distribution features conversion means for converting a frequency distribution features into a color distribution features indicative of feature similar to image features represented by the frequency distribution features in question, and color distribution similarity calculation means for comparing the color distribution features of the inquiry image with the color distribution features of each the image to be searched and determining a similarity of each image to search for a similar image, wherein the frequency distribution features conversion means renders all the kinds of image features amounts of each image to be searched and the inquiry image into the color distribution features.

In another preferred construction, the image search system further comprises means for referring to data of the image features amount of each the image to be searched, means for receiving input of data of the image features amount of the inquiry image, frequency distribution features conversion means for converting a frequency distribution features into a color distribution features indicative of feature similar to image features represented by the frequency distribution features in question, and color distribution similarity calculation means for comparing the color distribution features of the inquiry image with the color distribution features of each the image to be searched and determining a similarity of each image to search for a similar image, wherein the frequency distribution features conversion means renders all the kinds of image features amounts of each image to be searched and the inquiry image into the color distribution features.

In another preferred construction, the image search system further comprises frequency distribution features conversion means for converting a frequency distribution features into a color distribution features indicative of feature similar to image features represented by the frequency distribution features in question, and color distribution similarity calculation means for comparing the color distribution features of the inquiry image with the color distribution features of each the image to be searched and determining a similarity of each image to search for a similar image, wherein the frequency distribution features conversion means renders all the kinds of image features amounts of each image to be searched and the inquiry image into the color distribution features, and the frequency distribution features conversion means includes inverse-frequency transformation means for decoding an applied frequency distribution features to generate a decoded image, and color distribution features extraction means for extracting each pixel value of the decoded image as a color constituent features to extract a color distribution features indicative of feature similar to image features represented by the applied frequency distribution features.

In another preferred construction, the image search system further comprises means for referring to data of the image features amount of each the image to be searched, means for receiving input of data of the image features amount of the inquiry image, frequency distribution features conversion means for converting a frequency distribution features into a color distribution features indicative of feature similar to image features represented by the frequency distribution features in question, and color distribution similarity calculation means for comparing the color distribution features of the inquiry image with the color distribution features of each the image to be searched and determining a similarity of each image to search for a similar image, wherein the frequency distribution features conversion means renders all the kinds of image features amounts of each image to be searched and the inquiry image into the color distribution features, and the frequency distribution features conversion means includes inverse-frequency transformation means for decoding an applied frequency distribution features to generate a decoded image, and color distribution features extraction means for extracting each pixel value of the decoded image as a color constituent features to extract a color distribution features indicative of feature similar to image features represented by the applied frequency distribution features.

In another preferred construction, the image search system further comprises frequency distribution features conversion means for converting a frequency distribution features into a color distribution features indicative of feature similar to image features represented by the frequency distribution features in question, and color distribution similarity calculation means for comparing the color distribution features of the inquiry image with the color distribution features of each the image to be searched and determining a similarity of each image to search for a similar image, wherein the frequency distribution features conversion means renders all the kinds of image features amounts of each image to be searched and the inquiry image into the color distribution features, and the frequency distribution features conversion means includes inverse-frequency transformation means for decoding an applied frequency distribution features to generate a decoded image, image division means for dividing the decoded image into a predetermined plurality of blocks, and color distribution features extraction means for calculating each color constituent features of each the block to extract a color distribution features indicative of feature similar to image features represented by the applied frequency distribution features.

In another preferred construction, the image search system further comprises means for referring to data of the image features amount of each the image to be searched, means for receiving input of data of the image features amount of the inquiry image, frequency distribution features conversion means for converting a frequency distribution features into a color distribution features indicative of feature similar to image features represented by the frequency distribution features in question, and color distribution similarity calculation means for comparing the color distribution features of the inquiry image with the color distribution features of each the image to be searched and determining a similarity of each image to search for a similar image, wherein the frequency distribution features conversion means renders all the kinds of image features amounts of each image to be searched and the inquiry image into the color distribution features, and the frequency distribution features conversion means includes inverse-frequency transformation means for decoding an applied frequency distribution features to generate a decoded image, image division means for dividing the decoded image into a predetermined plurality of blocks, and color distribution features extraction means for calculating each color constituent features of each the block to extract a color distribution features indicative of feature similar to image features represented by the applied frequency distribution features.

In another preferred construction, the image search system further comprises frequency distribution features conversion means for converting a frequency distribution features into a color distribution features indicative of feature similar to image features represented by the frequency distribution features in question, and color distribution similarity calculation means for comparing the color distribution features of the inquiry image with the color distribution features of each the image to be searched and determining a similarity of each image to search for a similar image, wherein the frequency distribution features conversion means renders all the kinds of image features amounts of each image to be searched and the inquiry image into the color distribution features, and the frequency distribution features conversion means includes inverse-frequency transformation means for decoding an applied frequency distribution features to generate a decoded image, image division means for dividing the decoded image into a predetermined plurality of blocks, and color distribution features extraction means for calculating each color constituent features of each the block to extract a color distribution features indicative of feature similar to image features represented by the applied frequency distribution features, and the color distribution features extraction means determines a representative color of each the block obtained by the division by the image division means to extract a set of the representative colors as a color distribution features.

In another preferred construction, the color distribution features extraction means calculates a color mean of a pixel in each the block obtained by the division by the image division means to determine a color of the calculated color mean as the representative color.

In another preferred construction, the image search system further comprises color distribution features conversion means for converting a color distribution features into a frequency distribution features indicative of feature similar to image features represented by the color distribution features in question, and frequency distribution similarity calculation means for comparing the frequency distribution features of the inquiry image with the frequency distribution features of each the image to be searched and determining a similarity of each image to search for a similar image, wherein the color distribution features conversion means renders all the kinds of image features amounts of each image to be searched and the inquiry image into the frequency distribution features.

In another preferred construction, the image search system further comprises means for referring to data of the image features amount of each the image to be searched, means for receiving input of data of the image features amount of the inquiry image, color distribution features conversion means for converting a color distribution features into a frequency distribution features indicative of feature similar to image features represented by the color distribution features in question, and frequency distribution similarity calculation means for comparing the frequency distribution features of the inquiry image with the frequency distribution features of each the image to be searched and determining a similarity of each image to search for a similar image, wherein the color distribution features conversion means renders all the kinds of image features amounts of each image to be searched and the inquiry image into the frequency distribution features.

In another preferred construction, the color distribution features conversion means comprises representative color determination means for determining a representative color of each bock in an applied color distribution features, image generation means for generating an image which uses the representative color of each the block as a pixel, image size change means for changing the size of the image generated by the image generation means to a predetermined size, and frequency distribution features extraction means for frequency-converting the image changed by the image size change means to extract a frequency distribution features indicative of feature similar to the image features represented by the applied color distribution features.

In another preferred construction, each the image to be searched is set to be a target whose kind of the image features amount is to be converted, and the kind of image features amount of each the image to be searched is converted to be coincident with the kind of image features amount of the inquiry image.

In another preferred construction, the inquiry image is set to be a target whose kind of the image features amount is to be converted, and the kind of image features amount of the inquiry image is converted to be coincident with the kind of image features amount of each the image to be searched.

In another preferred construction, both the images, the inquiry image and the image to be searched, are set to be a target whose kind of the image features amount is to be converted, and the kinds of image features of the respective images, the inquiry image and the each image to be searched, are converted.

In another preferred construction, a circuit for converting a kind of image features amount of the inquiry image and a circuit for converting a kind of image features amount of each the image to be searched are provided independently.

In another preferred construction, the color distribution features is set to be an image features amount obtained by dividing an image as an object representing feature into a predetermined plurality of blocks and determining a representative color of each the block to generate data of the representative color corresponding to each the block.

In another preferred construction, the frequency distribution features is set to be an image features amount generated by converting an image as an object representing feature into a reduced image of a fixed size and subjecting the reduced image to frequency transformation.

In another preferred construction, the frequency distribution features is set to be an image features amount generated by converting an image as an object representing feature into a reduced image of a fixed size and subjecting the reduced image to frequency transformation and quantization.

According to another aspect of the invention, an image search method of determining a similarity of an image whose feature are represented by either one of image features amounts, a color distribution features or a frequency distribution features, to search for a similar image, comprising the steps of with respect to an image set to be a target whose kind of image features amount is to be converted among respective images to be searched and an inquiry image, converting the kind of image features amount of the image in question to make kinds of image features amounts of each the image to be searched and the inquiry image coincident with each other, and comparing the image features amount of the inquiry image with the image features amount of each the image to be searched based on the converted image features amount and determining a similarity of each image to search for a similar image.

In the preferred construction, the image search method further comprising the steps of referring to data of the image features amount of each the image to be searched, and receiving input of data of the image features amount of the inquiry image.

In another preferred construction, the image search method further comprises a frequency distribution features conversion step of converting a frequency distribution features into a color distribution features indicative of feature similar to image features represented by the frequency distribution features in question, and a color distribution similarity calculation step of comparing the color distribution features of the inquiry image with the color distribution features of each the image to be searched and determining a similarity of each image to search for a similar image, wherein the frequency distribution features conversion step renders all the kinds of image features amounts of each image to be searched and the inquiry image into the color distribution features.

In another preferred construction, the image search method further comprises a step of referring to data of the image features amount of each the image to be searched, a step of receiving input of data of the image features amount of the inquiry image, a frequency distribution features conversion step of converting a frequency distribution features into a color distribution features indicative of feature similar to image features represented by the frequency distribution features in question, and a color distribution similarity calculation step of comparing the color distribution features of the inquiry image with the color distribution features of each the image to be searched and determining a similarity of each image to search for a similar image, wherein the frequency distribution features conversion step renders all the kinds of image features amounts of each image to be searched and the inquiry image into the color distribution features.

In another preferred construction, the image search method further comprises a frequency distribution features conversion step of converting a frequency distribution features into a color distribution features indicative of feature similar to image features represented by the frequency distribution features in question, and a color distribution similarity calculation step of comparing the color distribution features of the inquiry image with the color distribution features of each the image to be searched and determining a similarity of each image to search for a similar image, wherein the frequency distribution features conversion step renders all the kinds of image features amounts of each image to be searched and the inquiry image into the color distribution features, and the frequency distribution features conversion step includes an inverse-frequency transformation step of decoding an applied frequency distribution features to generate a decoded image, and a color distribution features extraction step of extracting each pixel value of the decoded image as a color constituent features to extract a color distribution features indicative of feature similar to image features represented by the applied frequency distribution features.

In another preferred construction, the image search method further comprises a step of referring to data of the image features amount of each the image to be searched, a step of receiving input of data of the image features amount of the inquiry image, a frequency distribution features conversion step of converting a frequency distribution features into a color distribution features indicative of feature similar to image features represented by the frequency distribution features in question, and a color distribution similarity calculation step of comparing the color distribution features of the inquiry image with the color distribution features of each the image to be searched and determining a similarity of each image to search for a similar image, wherein the frequency distribution features conversion step renders all the kinds of image features amounts of each image to be searched and the inquiry image into the color distribution features, and the frequency distribution features conversion step includes an inverse-frequency transformation step of decoding an applied frequency distribution features to generate a decoded image, and a color distribution features extraction step of extracting each pixel value of the decoded image as a color constituent features to extract a color distribution features indicative of feature similar to image features represented by the applied frequency distribution features.

In another preferred construction, the image search method further comprises a frequency distribution features conversion step of converting a frequency distribution features into a color distribution features indicative of feature similar to image features represented by the frequency distribution features in question, and a color distribution similarity calculation step of comparing the color distribution features of the inquiry image with the color distribution features of each the image to be searched and determining a similarity of each image to search for a similar image, wherein the frequency distribution features conversion step renders all the kinds of image features amounts of each image to be searched and the inquiry image into the color distribution features, and the frequency distribution features conversion step includes an inverse-frequency transformation step of decoding an applied frequency distribution features to generate a decoded image, an image division step of dividing the decoded image into a predetermined plurality of blocks, and a color distribution features extraction step of calculating each color constituent features of each the block to extract a color distribution features indicative of feature similar to image features represented by the applied frequency distribution features.

In another preferred construction, the image search method further comprises a step of referring to data of the image features amount of each the image to be searched, a step of receiving input of data of the image features amount of the inquiry image, a frequency distribution features conversion step of converting a frequency distribution features into a color distribution features indicative of feature similar to image features represented by the frequency distribution features in question, and a color distribution similarity calculation step of comparing the color distribution features of the inquiry image with the color distribution features of each the image to be searched and determining a similarity of each image to search for a similar image, wherein the frequency distribution features conversion step renders all the kinds of image features amounts of each image to be searched and the inquiry image into the color distribution features, and the frequency distribution features conversion step includes an inverse-frequency transformation step of decoding an applied frequency distribution features to generate a decoded image, an image division step of dividing the decoded image into a predetermined plurality of blocks, and a color distribution features extraction step of calculating each color constituent features of each the block to extract a color distribution features indicative of feature similar to image features represented by the applied frequency distribution features.

In another preferred construction, the color distribution features extraction step determines a representative color of each the block obtained by the division by the image division step to extract a set of the representative colors as a color distribution features.

In another preferred construction, the color distribution features extraction step calculates a color mean of a pixel in each the block obtained by the division by the image division step to determine a color of the calculated color mean as the representative color.

In another preferred construction, the image search method further comprises a color distribution features conversion step of converting a color distribution features into a frequency distribution features indicative of feature similar to image features represented by the color distribution features in question, and a frequency distribution similarity calculation step of comparing the frequency distribution features of the inquiry image with the frequency distribution features of each the image to be searched and determining a similarity of each image to search for a similar image, wherein the color distribution features conversion step renders all the kinds of image features amounts of each image to be searched and the inquiry image into the frequency distribution features.

In another preferred construction, the image search method further comprises a step of referring to data of the image features amount of each the image to be searched, a step of receiving input of data of the image features amount of the inquiry image, a color distribution features conversion step of converting a color distribution features into a frequency distribution features indicative of feature similar to image features represented by the color distribution features in question, and a frequency distribution similarity calculation step of comparing the frequency distribution features of the inquiry image with the frequency distribution features of each the image to be searched and determining a similarity of each image to search for a similar image, wherein the color distribution features conversion step renders all the kinds of image features amounts of each image to be searched and the inquiry image into the frequency distribution features.

In another preferred construction, the color distribution features conversion step comprises a representative color determination step of determining a representative color of each bock in an applied color distribution features, an image generation step of generating an image which uses the representative color of each the block as a pixel, an image size change step of changing the size of the image generated by the image generation step to a predetermined size, and a frequency distribution features extraction step of frequency-converting the image changed by the image size change step to extract a frequency distribution features indicative of feature similar to the image features represented by the applied color distribution features.

According to a further aspect of the invention, an image search program for determining a similarity of an image whose feature are represented by either one of image features amounts, a color distribution features or a frequency distribution features, to search for a similar image by controlling a computer, comprising the functions of with respect to an image set to be a target whose kind of image features amount is to be converted among respective images to be searched and an inquiry image, converting the kind of image features amount of the image in question to make kinds of image features amounts of each the image to be searched and the inquiry image coincident with each other, and comparing the image features amount of the inquiry image with the image features amount of each the image to be searched based on the converted image features amount and determining a similarity of each image to search for a similar image.

The image search system of the present invention decodes a frequency distribution features of an image to convert the amount into an image and extracts a representative color from each block obtained by dividing the converted image into a plurality of blocks to generate a set of the colors as a color distribution features, thereby realizing conversion from the frequency distribution features to the color distribution features. In addition, the system calculates a mean color of each block from a representative color of each block contained in the color distribution features to generate an image having the mean color of each block as a pixel, magnifies or reduces the image and conducts frequency analyses of the image to generate a frequency distribution features, thereby realizing conversion from the color distribution features to the frequency distribution features.

It is therefore possible, even when a color distribution features and a frequency distribution features exist as an image features, to determine similarities by alternately converting kinds of features to each other to unify a kind.

As a result, search of a similar image can be realized irrespective of a kind of image features amount. In addition, a system whose similarity determination function is adapted only to either one of a color distribution features and a frequency distribution features is allowed to calculate and search for a similarity of an image of any kind of image features amount.

Other objects, feature and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
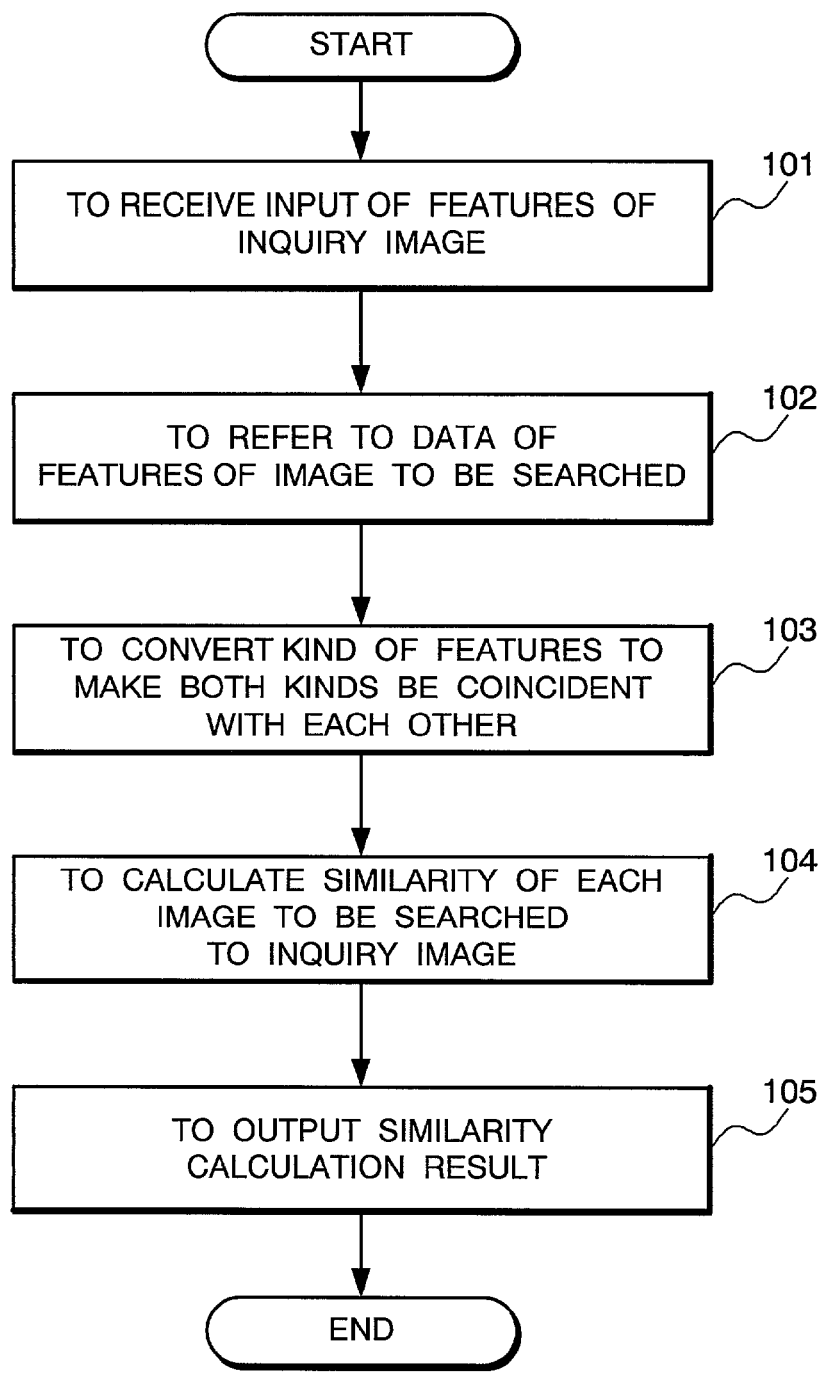
FIG. 1 is a flow chart for use in explaining processing of an image search system according to one embodiment of the present invention.

FIG. 1 is a flow chart for use in explaining processing of an image search system according to one embodiment of the present invention.

In the example of image search processing shown in FIG. 1, first, the image search system receives input of an image features of an inquiry image which is an image whose search is inquired and refers to data of an image features of each image to be searched (Steps 101, 102). Here, the kind of image features of each image is either a color distribution features or a frequency distribution features.

Here, since when the inquiry image and each image to be searched differ in a kind of image features, determination or search of similarities is impossible, set kinds of both image features to be coincident with each other by converting the kinds of the image features (Step 103).

Then, using the converted image features, compare the image features of the inquiry image with an image features of each image to be searched to calculate a similarity (Step 104) and output a calculation result of the similarity (Step 105).

Here, data of an image to be searched is obtained, for example, by referring to data stored in advance in a storage unit such as a hard disc or a semiconductor memory or to data stored in an external server through a communication network.

Although in the example of FIG. 1, reception of an inquiry image and reference to an image to be searched are conducted according to an image features imilarly executable is a manner of accepting (or referring to) image data as it is and extracting an image features from the image data to conduct Step 103 and the following steps.

The method of alternately converting image features between a color distribution features and a frequency distribution features at Step 103 will be described in detail in each of the following embodiments.

In addition, although in the example shown in FIG. 1, the processing ends up with output of a similarity calculation result, it may end up with output of an image whose similarity is calculated to be high as a research result as well. Moreover, other than calculating similarities of a plurality of images to be searched to an inquiry image, processing of outputting data of a similarity of one image to be searched to an inquiry image is executable as well.

[First Embodiment]

Figure 2:
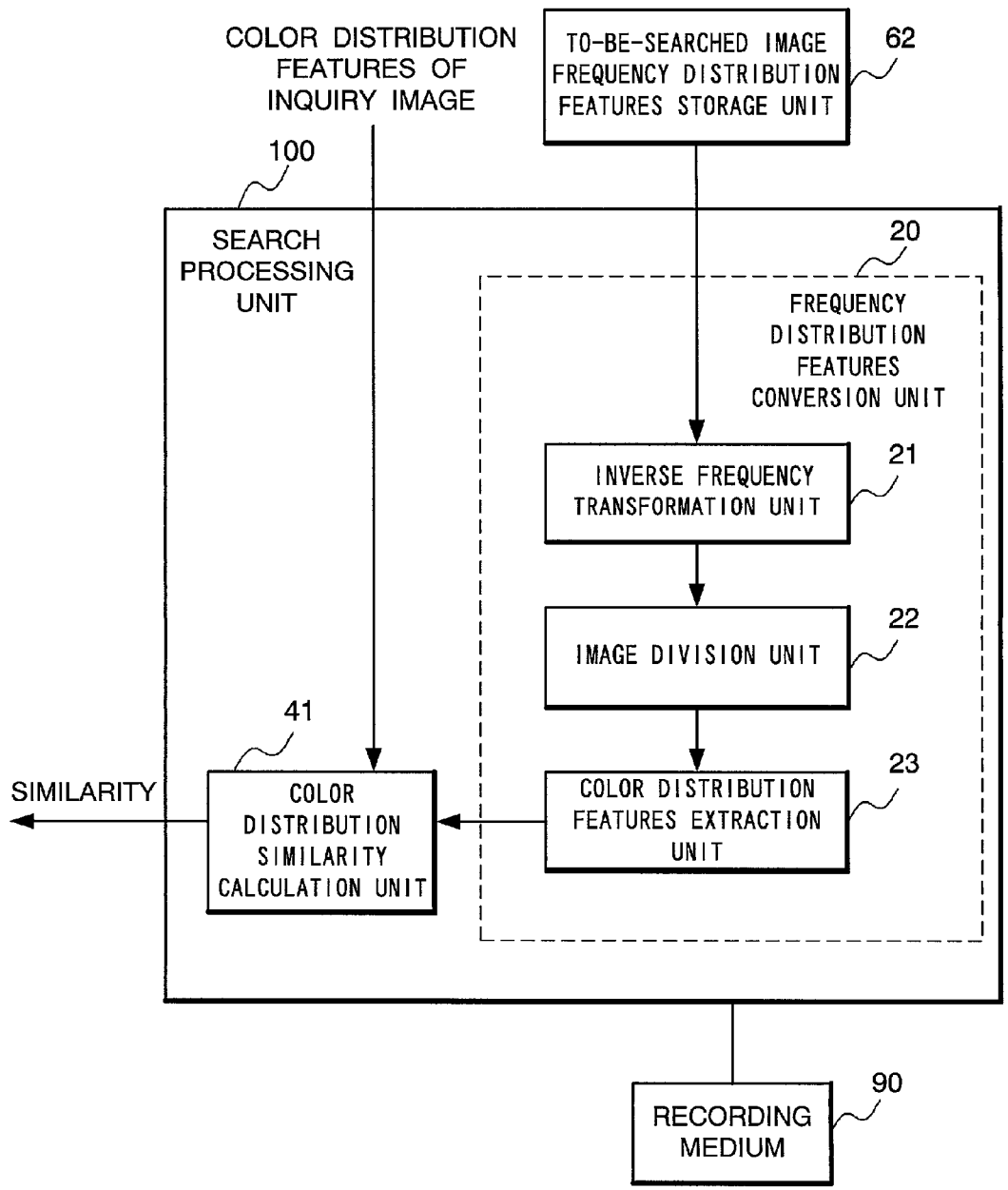
FIG. 2 is a block diagram showing a structure of an image search system according to a first embodiment of the present invention.

FIG. 2 is a block diagram showing a structure of an image search system according a first embodiment of the present invention.

With reference to FIG. 2, the image search system of the present embodiment includes a to-be-searched image frequency distribution features storage unit 62, a frequency distribution features conversion unit 20 and a color distribution similarity calculation unit 41. The frequency distribution features conversion unit 20 includes an inverse-frequency transformation unit 21, an image division unit 22 and a color distribution features extraction unit 23.

The to-be-searched image frequency distribution features storage unit 62 stores a frequency distribution features of an image which is an image features of an image to be searched. Here, a frequency distribution features of an image represents an feature indicative of a frequency distribution of the image, one example of which is a value indicative of an energy of each band obtained by converting an image to have a fixed size, dividing a frequency distribution of a color spectrum of the converted image into a plurality bands and executing frequency analyses of the bands using an orthogonal matrix such as DCT (Discrete Cosine Transform). The frequency distribution features may be stored after being subjected to quantization.

Figure 3:
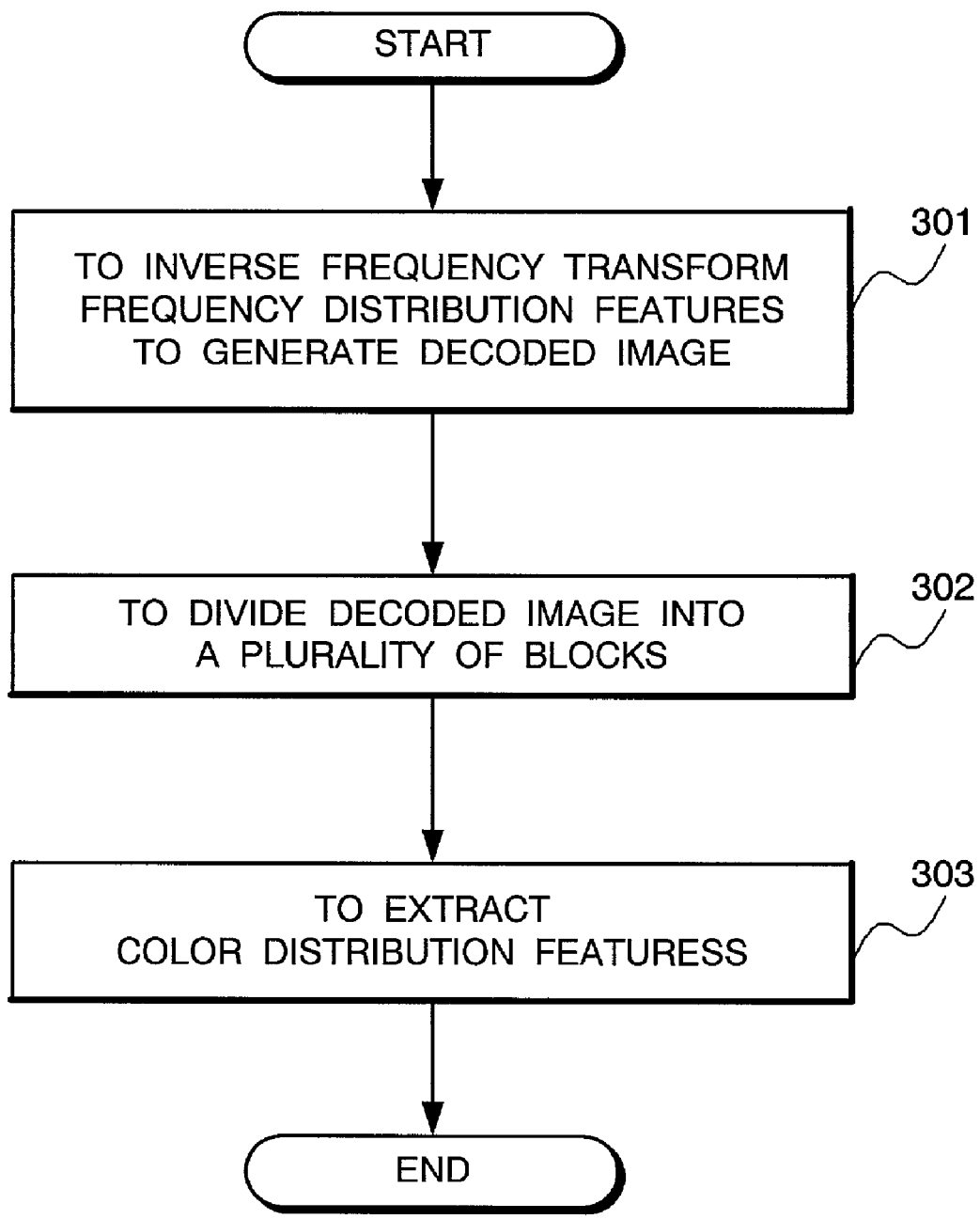
FIG. 3 is a flow chart for use in explaining processing of a frequency distribution features conversion unit in one embodiment of the present invention.

FIG. 3 is a flow chart for use in explaining processing of the frequency distribution features conversion unit 20 according to the present embodiment.

In the frequency distribution features conversion unit 20, first, the inverse-frequency transformation unit 21 inverse-frequency-converts a frequency distribution features read from the frequency distribution features storage unit 62 to generate and output a decoded image (Step 301). As inverse-frequency transformation, inverse discrete cosine transform (IDCT) is conducted to restore an image in a case where discrete cosine transformation (DCT) is used as a frequency analysis method at the time of generating a frequency distribution features.

Subsequently, the image division unit 22 divides the applied decoded image into a fixed plurality of blocks (Step 302).

Then, the color distribution features extraction unit 23 determines a color constituent features of each of the blocks obtained by the division by the image division unit 22 to extract a set of the amounts as a color distribution features (Step 303). Here, the color constituent features representing color constituent of each block is an feature which is composed of a representative color representing each block of the image and its constituent rate and which may include a frequency rate of every color contained in each block, one or a plurality of representative colors and its or their color constituent rates or the like.

The color distribution similarity calculation unit 41 calculates a similarity between a color distribution features of an inquiry image applied as the image features for use in inquiry and the color distribution features generated by the frequency distribution features conversion unit 20.

Next, processing of the image search system according to the present embodiment will be described with respect to a specific example.

First, with respect to each image to be searched, after dividing the image into, for example, 8×8=64 blocks, calculate a mean value (of color, pixel) of each individual block to generate a reduced image having 8 pixels by 8 pixels. Next, subject the reduced image to DCT to regard an obtained coefficient as a frequency distribution features of the original image. By this method, a frequency distribution features of each image to be searched is extracted and stored in advance in the frequency distribution features storage unit 62.

Here, a mean of a color denotes a mean value of numeric data in a case where color data is expressed by various kinds of methods such as RGB color space, YCbCr color space and HSV color space. When each of the various kinds of color spaces has a unique method of calculating a mean of a color, the mean value will be obtained by such a method.

Also with respect to an inquiry image, after dividing the image into, for example, 4×4=16 blocks, extract a color constituent features composed of data of a representative color which represents each individual block and its constituent rate to assume a set of data of correspondence between each block and its color constituent features to be a color distribution features of the inquiry image.

Here, for the search for an image whose feature is similar by using the color distribution features of the inquiry image, data of the frequency distribution features stored in the frequency distribution features storage unit 62 will be converted into a color distribution features and both images will be compared using their color distribution features to calculate similarities.

For this purpose, the image search system first conducts inverse discrete cosine transform (IDCT) with respect to the frequency distribution features read from the to-be-searched image frequency distribution features storage unit 62 to generate an image of 8 pixels by 8 pixels.

Next, after dividing the obtained image of 8 pixels by 8 pixels into 4×4=16 blocks, extract a color constituent features composed of a representative color representing an individual block and its constituent rate.

As a result, since the inquiry image and an image to be searched can be compared with respect to the feature of the same dimension, search is realized by comparing a color distribution features which is a set of extracted color constituent features and the color distribution features of the inquiry image and calculating their similarities.

By thus sequentially reading frequency distribution features of a plurality of images to be searched which are stored in the to-be-searched image frequency distribution features storage unit 62 and calculating a similarity between a color distribution features obtained by converting the read frequency distribution features and the color distribution features of the inquiry image to select an image to be searched according to the degree of the calculated similarity, an image similar to the inquiry image can be specified from among the plurality of images to be searched whose frequency distribution features is stored in the to-be-searched image frequency distribution features storage unit 62.

As described in the foregoing, the image search system of the present embodiment enables calculation of a similarity between a color distribution features obtained by converting a frequency distribution features which is an image features and an applied color distribution features. Moreover, since both a color distribution features and a frequency distribution features can be handled by the same similarity calculation unit, the structure of the search system can be scaled down.

Furthermore, an image search system can be provided which is capable of conducting search regardless whether an image features is a color distribution features or a frequency distribution features.

[Second Embodiment]

Figure 4:
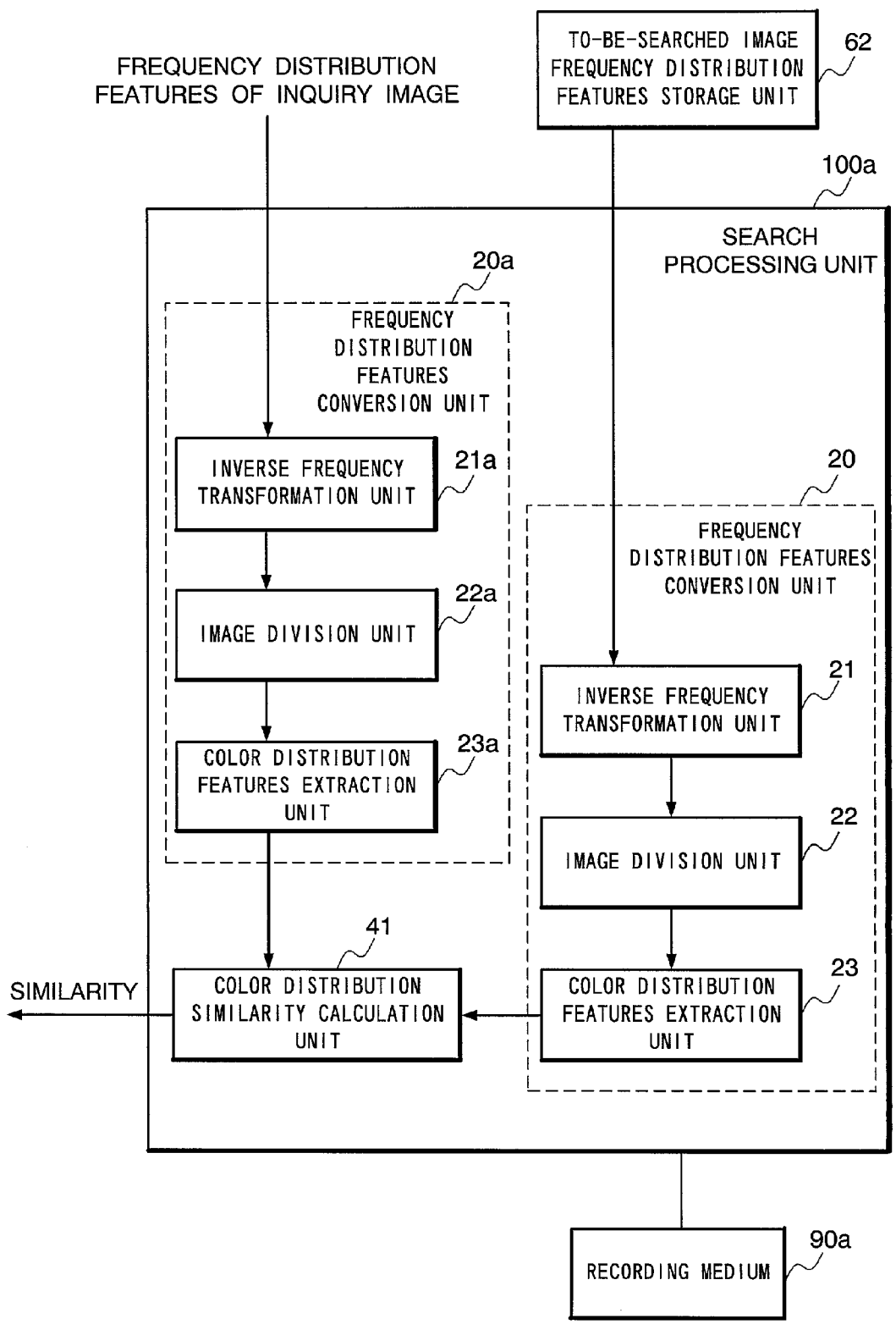
FIG. 4 is a block diagram showing a structure of an image search system according to a second embodiment of the present invention.

FIG. 4 is a block diagram showing a structure of an image search system according to a second embodiment of the present invention. With reference to FIG. 4, the image search system of the present embodiment includes the to-be-searched image frequency distribution features storage unit 62, frequency distribution features conversion units 20 and 20a and the color distribution similarity calculation unit 41. The frequency distribution features conversion units 20 and 20a include inverse-frequency transformation units 21 and 21a, image division units 22 and 22a and color distribution features extraction units 23 and 23a, respectively.

The to-be-searched image frequency distribution features storage unit 62 stores a frequency distribution features which is an image features of an image to be searched.

In the frequency distribution features conversion unit 20 on the side of the frequency distribution features storage unit 62, the inverse-frequency transformation unit 21 inverse-frequency-converts a frequency distribution features read from the frequency distribution features storage unit 62 to output a decoded image. The image division unit 22 divides the applied decoded image into a plurality of blocks. The color distribution features extraction unit 23 generates a color constituent features from each divisional block obtained by the division by the image division unit 22 to extract a set of the amounts as a color distribution features.

In a case where the number of blocks (vertical and horizontal) to be divided by the image division unit 22 coincides with the number of pixels (vertical and horizontal) of the decoded image itself, the image division unit 22 has no need of dividing the decoded image. In this case, the color distribution features extraction unit 23 only needs to extract each pixel value of the decoded image as a color constituent features.

In the frequency distribution features conversion unit 20a on the side of receiving input of an inquiry image, the inverse-frequency transformation unit 21a inverse-frequency-converts a frequency distribution features of the inquiry image applied as the image features for use in inquiry to output a decoded image. The image division unit 22a divides the decoded image into a plurality of blocks. The color distribution features extraction unit 23 generates a color constituent features from each block obtained by the division by the image division unit 22a to extract a set of the amounts as a color distribution features.

The color distribution similarity calculation unit 41 calculates a similarity between the color distribution features generated by the frequency distribution features conversion unit 20 and the color distribution features generated by the frequency distribution features conversion unit 20a.

By thus sequentially reading the frequency distribution features of the plurality of images to be searched which are stored in the to-be-searched image frequency distribution features storage unit 62 to calculate a similarity between a color distribution features obtained by converting the read frequency distribution features and a color distribution features obtained by converting the frequency distribution features of the inquiry image, thereby selecting an image to be searched according to the degree of the calculated similarity, an image similar to the inquiry image can be specified from among the plurality of images to be searched whose frequency distribution features is stored in the to-be-searched image frequency distribution features storage unit 62.

As described in the foregoing, the image search system of the present embodiment enables calculation of a similarity between a color distribution features converted from a frequency distribution features which is an image features and a color distribution features converted from an applied frequency distribution features. It is therefore possible, also in a case where only the color distribution similarity calculation unit 41 is provided without the provision of a frequency distribution similarity calculation unit, to compare frequency distribution features.

Moreover, an image search system can be provided which is capable of conducting search regardless whether a kind of image features is a frequency distribution features or a color distribution features.

[Third Embodiment]

Figure 5:
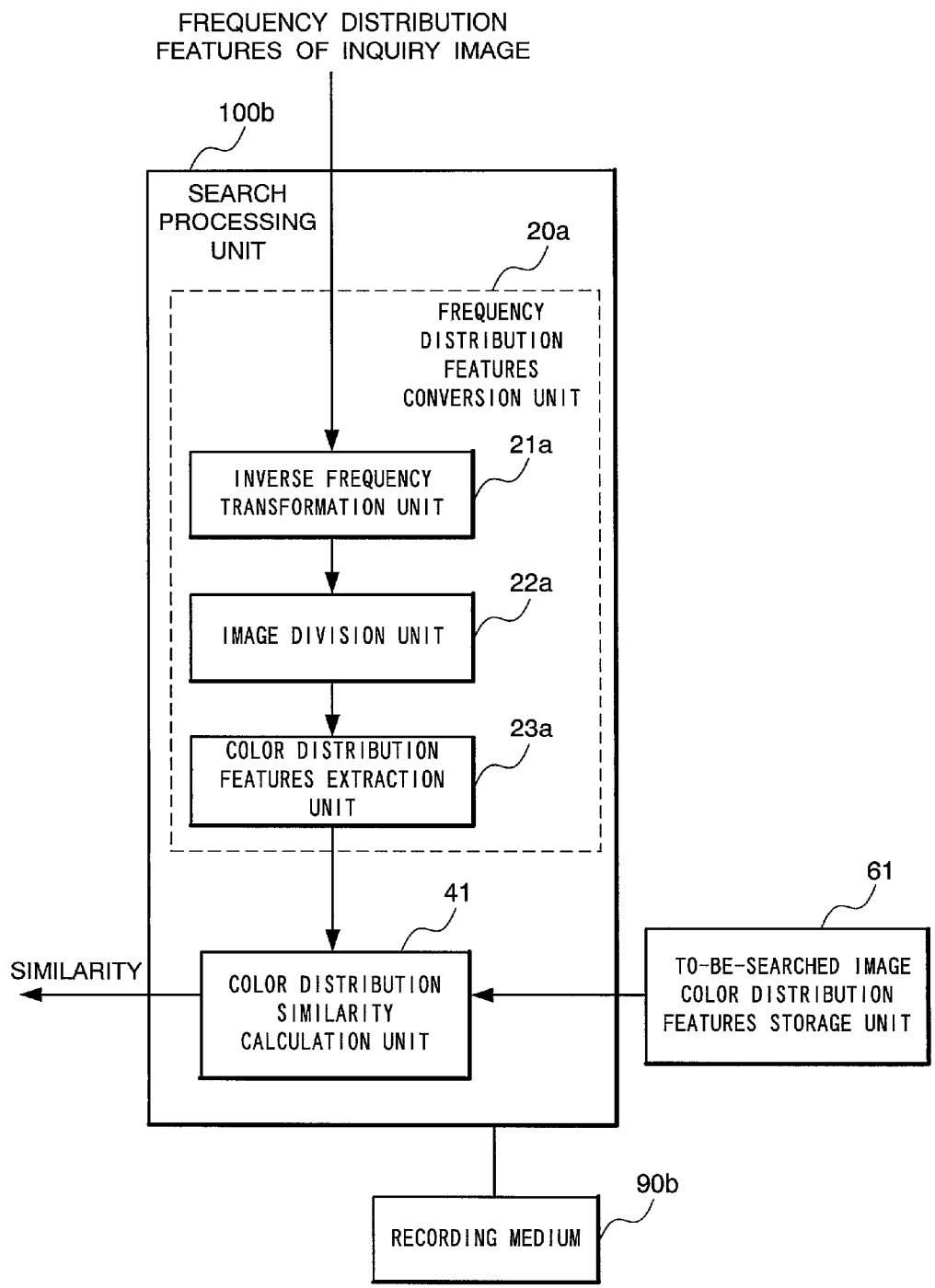
FIG. 5 is a block diagram showing a structure of an image search system according to a third embodiment of the present invention.

FIG. 5 is a block diagram showing a structure of an image search system according to a third embodiment of the present invention. With reference to FIG. 5, the image search system of the present embodiment includes a to-be-searched image color distribution features storage unit 61, the frequency distribution features conversion unit 20a and the color distribution similarity calculation unit 41. The frequency distribution features conversion unit 20*a* includes the inverse-frequency transformation unit 21*a*, the image division unit 22*a* and the color distribution features extraction unit 23*a*.

The to-be-searched image color distribution features storage unit 61 stores, as an image features of an image to be searched, a color distribution features which is a set of color constituent features of the respective blocks obtained by dividing the image to be searched into a plurality of blocks.

In the frequency distribution features conversion unit 20*a*, the inverse-frequency transformation unit 21*a* inverse-frequency-converts a frequency distribution features of an inquiry image applied as an image features for use in inquiry to output a decoded image. The image division unit 22*a* divides the applied decoded image into a plurality of blocks. The color distribution features extraction unit 23*a* generates a color constituent features from each block obtained by the division by the image division unit 22*a* to extract a set of the amounts as a color distribution features.

In a case where the number of blocks (vertical and horizontal) to be divided by the image division unit 22 coincides with the number of pixels (vertical and horizontal) of the decoded image itself, the image division unit 22*a* has no need of dividing the decoded image. In this case, the color distribution features extraction unit 23*a* only needs to extract each pixel value of the decoded image as a color constituent features.

The color distribution similarity calculation unit 41 calculates a similarity between the color distribution features generated by the frequency distribution features conversion unit 20*a* and a color distribution features read from the to-be-searched image color distribution features storage unit 61.

By thus sequentially reading color distribution features of the plurality of images to be searched which are stored in the to-be-searched image color distribution features storage unit 61 to calculate a similarity between the color distribution features and the color distribution features obtained by converting the frequency distribution features of the inquiry image, thereby selecting an image to be searched according to the degree of the calculated similarity, an image similar to the inquiry image can be specified from among the plurality of images to be searched whose color distribution features is stored in the to-be-searched image color distribution features storage unit 61.

As described in the foregoing, the image search system of the present embodiment enables calculation of a similarity between a color distribution features converted from a frequency distribution features of an applied image and a color distribution features which is an image features. This allows both of the color distribution features and the frequency distribution features to be handled by the same similarity calculation unit to realize reduction in scale of the search system structure.

Moreover, an image search system can be provided which is capable of conducting search regardless whether a kind of image features is a frequency distribution features or a color distribution features.

[Fourth Embodiment]

Figure 6:
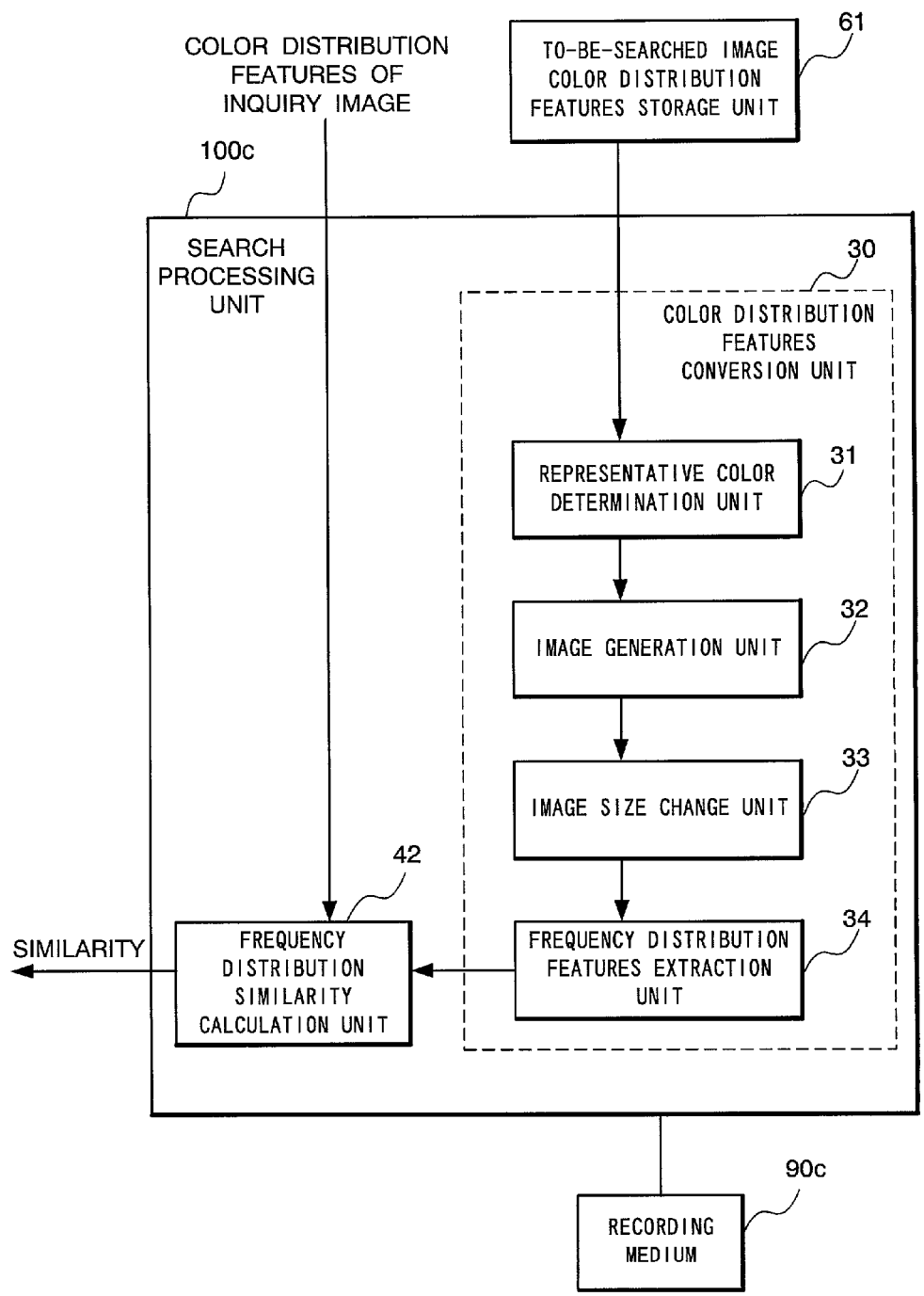
FIG. 6 is a block diagram showing a structure of an image search system according to a fourth embodiment of the present invention.

FIG. 6 is a block diagram showing a structure of an image search system according to a fourth embodiment of the present invention. With reference to FIG. 6, the image search system of the present embodiment includes the to-be-searched image color distribution features storage unit 61, a color distribution features conversion unit 30 and an frequency distribution similarity calculation unit 42. The color distribution features conversion unit 30 includes a representative color determination unit 31, an image generation unit 32, an image size change unit 33 and a frequency distribution features extraction unit 34.

The to-be-searched image color distribution features storage unit 61 stores, as an image features of an image to be searched, a color distribution features which is a set of color constituent features of the respective blocks obtained by dividing the image to be searched into a plurality of blocks.

Figure 7:
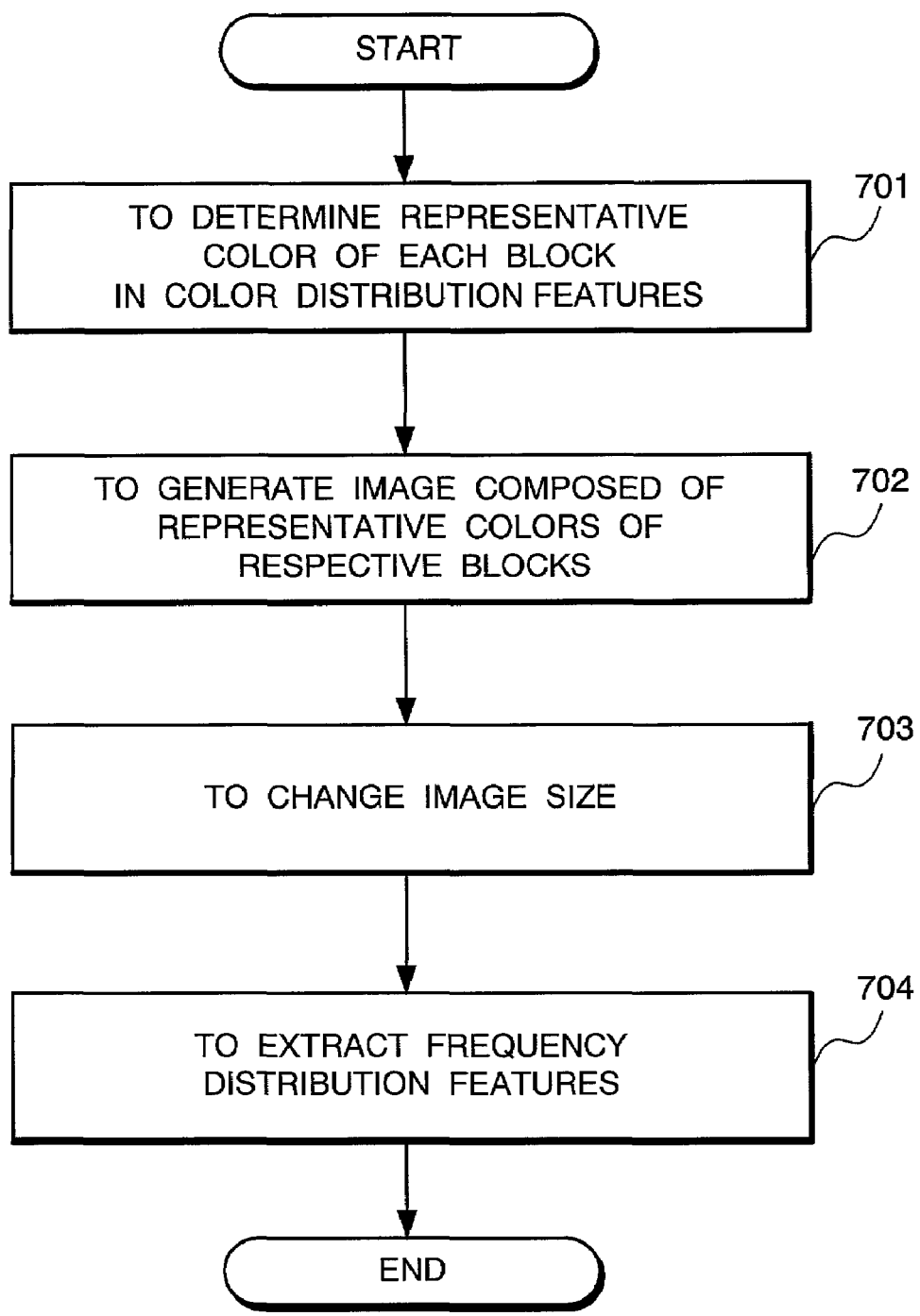
FIG. 7 is a flow chart for use in explaining processing of a color distribution features conversion unit in one embodiment of the present invention.

FIG. 7 is a flow chart for use in explaining processing of the color distribution features conversion unit 30 of the present embodiment.

In the color distribution features conversion unit 30, the representative color determination unit 31 determines a representative color of each block based on color constituent information of each block included in the color distribution features read from the to-be-searched image color distribution features storage unit 61 (Step 701). Here, applicable as a method of determining a representative color are calculating a mean value of a color contained in the color constituent features by multiplying each color by a rate of the same and adding all the multiplication results, obtaining a mean value by converting each color into a different color space (e.g. RGB color space, YCbCr color space and HSV color space) and other various methods using a mode, a medium value etc. as a representative color. The image generation unit 32 generates an image composed of the representative colors of the respective blocks calculated by the representative color determination unit 31 (Step 702).

The image size change unit 33 changes the size of the image generated by the image generation unit 32 to have a predetermined size (Step 703). The image size obtained after the conversion can be made coincident with the size of the original image at the generation of the frequency distribution features.

The frequency distribution features extraction unit 34 frequency-converts the image obtained by the image size change unit 33 to extract the frequency distribution features (Step 704).

The frequency distribution similarity calculation unit 42 calculates a similarity between a frequency distribution features of an inquiry image applied as the image features for use in inquiry and the frequency distribution features generated by the color distribution features conversion unit 30.

By thus sequentially reading color distribution features of the plurality of images to be searched which are stored in the to-be-searched image color distribution features storage unit 61 to calculate a similarity between an orthogonal conversion coefficient obtained by converting the read color distribution features and an orthogonal conversion coefficient of the inquiry image, thereby selecting an image to be searched according to the degree of the calculated similarity, an image similar to the inquiry image can be specified from among the plurality of images to be searched whose color distribution features is stored in the to-be-searched image color distribution features storage unit 61.

Next, processing of the image search system according to the present embodiment will be described with respect to a specific example.

First, with respect to each image to be searched, after dividing the image into, for example, 4×4=16 blocks, extract color constituent information composed of a representative color of an individual block which represents the block and its constituent rate to assume a set of the information to be a color distribution features of the original image. By this manner, a color distribution features of each image to be searched is extracted and stored in advance in the color distribution features storage unit 61.

Also with respect to an inquiry image, after dividing the image into, for example, 8×8=64 blocks, calculate a mean value of each individual block to generate a reduced image having 8 pixels by 8 pixels and subject the reduced image to DCT to regard an obtained coefficient as a frequency distribution features of the inquiry image.

Here, for the search for an image whose feature is similar to an inquiry image by using a frequency distribution features of the inquiry image, data of the color distribution features stored in the color distribution features storage unit 61 will be converted into frequency distribution information and both images will be compared using their frequency distribution features to calculate their similarities.

For this purpose, the image search system first calculates a representative color of each block from a color constituent features of each block included in the color distribution features read from the to-be-searched image color distribution features storage unit 61. The representative color can be calculated by multiplying each color by its rate and adding all the multiplication results.

Then, generate an image having 4 pixels by 4 pixels which is composed of the calculated representative colors of the respective blocks.

Next, expand the image of 4 pixels by 4 pixels to an image of 8 pixels by 8 pixels whose image size is a target of frequency transformation at the time of generating a frequency distribution features of the inquiry image.

Next, after dividing the image into, for example, 8×8=64 blocks, calculate a mean value of an individual block to generate a reduced image of 8 pixels by 8 pixels, and subject the reduced image to DCT to extract the obtained coefficient as a frequency distribution features of the image to be searched.

As a result, since an inquiry image and an image to be searched can be compared with respect to feature of the same dimension, search is realized by comparing the extracted frequency distribution features and the frequency distribution features of the inquiry image to calculate their similarities.

As described in the foregoing, the image search system of the present embodiment enables calculation of a similarity between a frequency distribution features applied as an image features for use in inquiry and a frequency distribution features obtained by converting a color distribution features of an image which is an image features. This enables the same similarity calculation unit to handle both a color distribution features and a frequency distribution features to reduce the scale of the search system structure.

Furthermore, an image search system can be provided which is capable of conducting search regardless whether a kind of image features is a frequency distribution features or a color distribution features.

[Fifth Embodiment]

Figure 8:
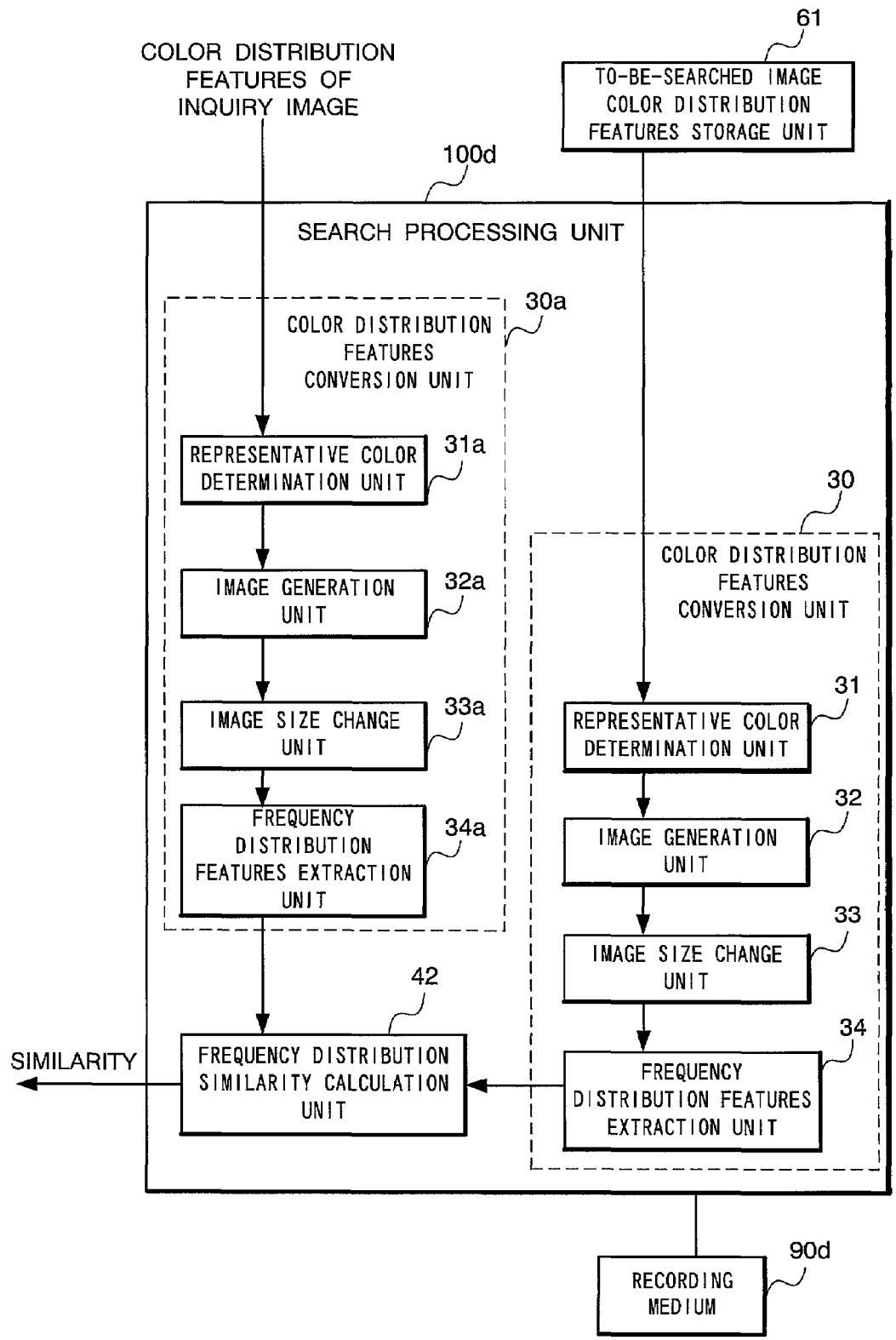
FIG. 8 is a block diagram showing a structure of an image search system according to a fifth embodiment of the present invention.

FIG. 8 is a block diagram showing a structure of an image search system according to a fifth embodiment of the present invention. With reference to FIG. 8, the image search system of the present embodiment includes the to-be-searched image color distribution features storage unit 61, color distribution features conversion units 30 and 30*a* and the frequency distribution similarity calculation unit 42. The color distribution features conversion units 30 and 30*a* include representative color determination units 31 and 31*a*, image generation units 32 and 32*a*, image size change units 33 and 33*a* and frequency distribution features extraction units 34 and 34*a*.

The to-be-searched image color distribution features storage unit 61 stores, as an image features of an image to be searched, a color distribution features which is a set of color constituent feature of respective blocks obtained by dividing the image to be searched into a plurality of blocks.

In the color distribution features conversion unit 30 on the side of the color distribution features storage unit 61, the representative color determination unit 31 calculates a representative color of each block from a color constituent features of each block included in the color distribution features read from the to-be-searched image color distribution features storage unit 61. Here, the representative color can be set to be a mean value of a color contained in the color constituent features. Calculation can be made by multiplying each color by a rate of the same and adding all the multiplication results. At the time of calculation of a mean value, the mean value may be obtained by converting each color into a different color space. Possible in addition to those mentioned above is using a mode, a medium value etc. as a representative color.

The image generation unit 32 generates an image composed of the representative colors of the respective blocks calculated by the representative color determination unit 31. The image size change unit 33 changes the size of the image generated by the image generation unit 32. The image size can be made coincident with the size of an image as the original at the generation of the frequency distribution features. The frequency distribution features extraction unit 34 conducts frequency-transformation of the image obtained by the image size change unit 33 to generate a frequency distribution features.

In the color distribution features conversion unit 30*a* on the side of receiving input of an inquiry image, the representative color determination unit 31*a* calculates a representative color of each block from a color constituent features of each block contained in the color distribution features of the inquiry image. Here, the representative color can be set to be a mean value of a color contained in a color histogram. Calculation can be made by multiplying each color by a rate of the same and adding all the multiplication results. At the time of calculation of a mean value, the mean value may be obtained by converting each color into a different color space. In addition to those mentioned above, it is possible to use a mode, a medium value etc. as a representative color.

The image generation unit 32*a* generates an image composed of the representative colors of the respective blocks calculated by the representative color determination unit 31*a*. The image size change unit 33*a* changes the size of the image generated by the image generation unit 32*a*. The image sizes can be made coincident with each other. The frequency distribution features extraction unit 34*a* conducts frequency-transformation of the image obtained by the image size change unit 33*a* to generate a frequency distribution features.

The frequency distribution similarity calculation unit 42 calculates a similarity between the frequency distribution features generated by the color distribution features conversion unit 30 and the frequency distribution features generated by the color distribution features conversion unit 30*a*.

By thus sequentially reading color distribution features of the plurality of images to be searched which are stored in the to-be-searched image color distribution features storage unit 61 to calculate a similarity between a frequency distribution features obtained by converting the read color distribution features and a frequency distribution features obtained by converting the color distribution features of the inquiry image, thereby selecting an image to be searched according to the degree of the calculated similarity, an image similar to the inquiry image can be specified from among the plurality of images to be searched whose color distribution features is stored in the to-be-searched image color distribution features storage unit 61.

As described in the foregoing, the image search system of the present embodiment enables calculation of a similarity between a frequency distribution features converted from a color distribution features of an image which is applied as an image features for use in inquiry and a frequency distribution features converted from a color distribution features of an image which is an image features. Therefore, even when no function of calculating a color distribution similarity is provided, this enables comparison of color distribution features by using the function of calculating a frequency distribution similarity.

Furthermore, an image search system can be provided which is capable of conducting search regardless whether a kind of image features is a frequency distribution features or a color distribution features.

[Sixth Embodiment]

Figure 9:
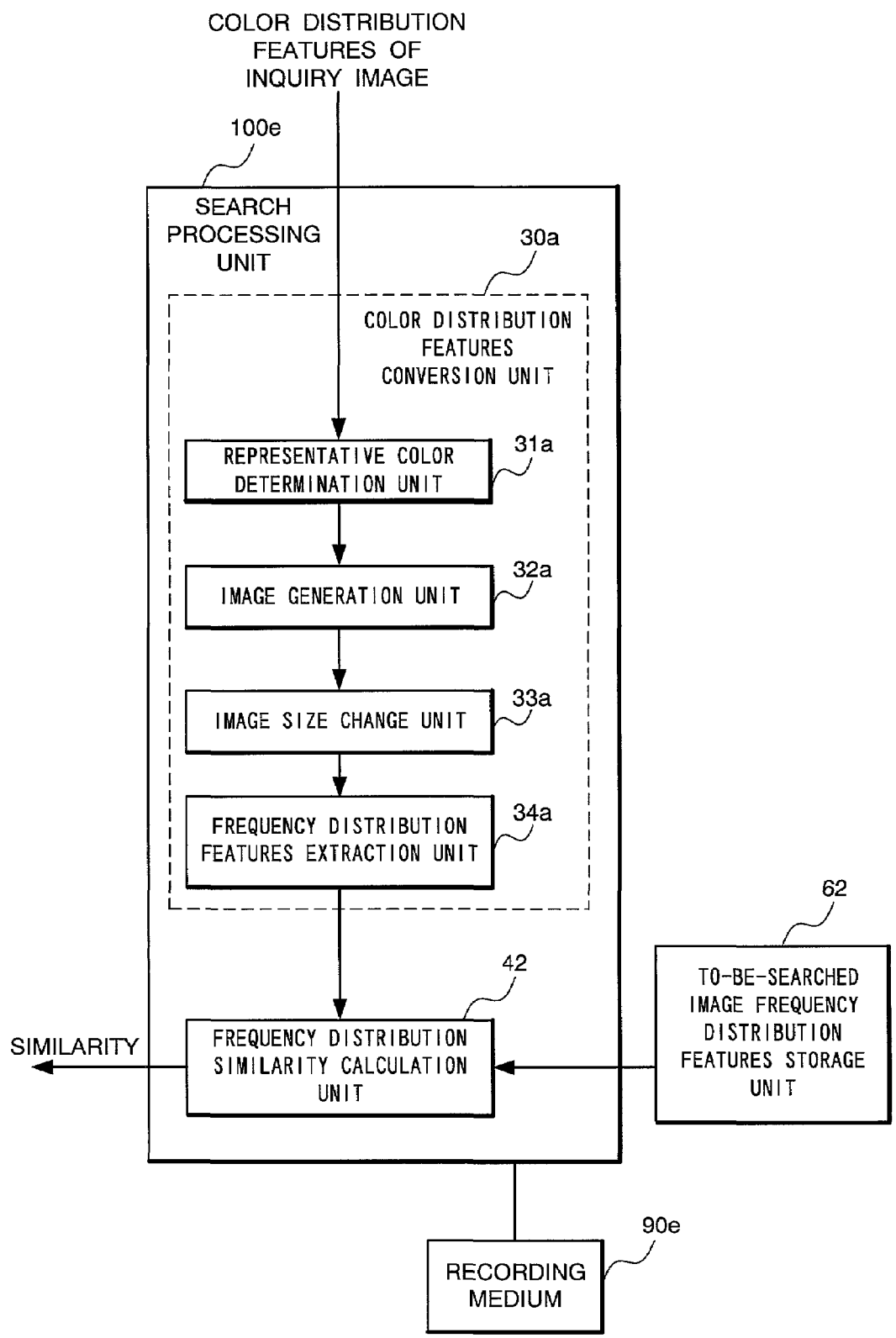
FIG. 9 is a block diagram showing a structure of an image search system according to a sixth embodiment of the present invention.

FIG. 9 is a block diagram showing a structure of an image search system according to a sixth embodiment of the present invention. With reference to FIG. 9, the image search system of the present embodiment includes the to-be-searched image frequency distribution features storage unit 62, the color distribution features conversion unit 30a and the frequency distribution similarity calculation unit 42. The color distribution features conversion unit 30a includes the representative color determination unit 31a, the image generation unit 32a, the image size change unit 33a and the frequency distribution features extraction unit 34a.

The to-be-searched image frequency distribution features storage unit 62 stores a frequency distribution features of an image which is an image features of an image to be searched.

In the color distribution features conversion unit 30a, the representative color determination unit 31a calculates a representative color of each block from a color constituent features of each block contained in a color distribution features of an inquiry image. Here, the representative color can be set to be a mean value of a color contained in the color constituent features. Calculation can be made by multiplying each color by a rate of the same and adding all the multiplication results. At the time of calculation of a mean value, a mean value may be obtained by converting each color into a different color space. In addition to those mentioned above, it is possible to use a mode, a medium value etc. as a representative color.

The image generation unit 32a generates an image composed of the representative colors of the respective blocks calculated by the representative color determination unit 31a. The image size change unit 33a changes the size of the image generated by the image generation unit 32a. The image size can be made coincident with each other. The frequency distribution features extraction unit 34a conducts frequency-transformation of the image obtained by the image size change unit 33a to generate a frequency distribution features.

The frequency distribution similarity calculation unit 42 calculates a similarity between the frequency distribution features generated by the color distribution features conversion unit 30a and a frequency distribution features read from the to-be-searched image frequency distribution features storage unit 62.

By thus sequentially reading frequency distribution features of the plurality of images to be searched which are stored in the to-be-searched image frequency distribution features storage unit 62 to calculate a similarity between the frequency distribution features and a frequency distribution features obtained by converting the color distribution features of the inquiry image, thereby selecting an image to be searched according to the degree of the calculated similarity, an image similar to the inquiry image can be specified from among the plurality of images to be searched whose frequency distribution features is stored in the to-be-searched image color distribution features storage unit 62.

As described in the foregoing, the image search system of the present embodiment enables calculation of a similarity between a frequency distribution features obtained by converting a color distribution features of an image which is applied as an image features for use in inquiry and a frequency distribution features of an image which is an image features. This enables the same similarity calculation unit to handle both color distribution information and a frequency distribution features, which allows reduction in a scale of a structure of the search system.

Furthermore, an image search system can be provided which is capable of conducting search regardless whether a kind of image features is a frequency distribution features or a color distribution features.

Next, description will be made of an experiment on search precision conducted for the search system of the present invention.

Experiment of the search processing by the search system of the present invention is here conducted using a data base which records data of 5466 sheets.

On this occasion, for each of 50 sheets of inquiry images, a similar image is selected and set as a right answer in advance by subjective evaluation. The images are arranged in descending order of similarity in the image features between an inquiry image and images included in the data base and the order of right images of higher ranks down to the n-th place and the number of the same are evaluated as "normalized mean search order" to evaluate search performance. Normalized mean search order is assumed to be a value obtained by normalizing, between 0 and 1, a value obtained by subtracting a mean value of an order in a case where all the right images are detected at the highest place from a mean value of an order of higher-ranking right images detected within the n-th place, and the smaller the value is, the higher the performance will be. "n" is assumed to be four times the number of right images selected in advance and right images not detected within the n-th place are all handled as being detected in the (n+1)th place.

The following two kinds of image features are prepared.

As a first image features, a frequency distribution features of an image is used. Generation method is as follows. Divide a still image into 8×8 blocks and calculate a mean color of each block to generate a reduced image of a fixed size (8 pixels by 8 pixels). Next, execute discrete cosine transform (DCT) with respect to the reduced image to extract a low-degree coefficient string of a luminance signal and a color difference signal. Furthermore, convert the obtained DCT coefficient using a conversion table to obtain a frequency distribution features A.

Used as the other image features is a color distribution features. Divide a still image into 8×8 blocks and extract color constituent information from each block and use the same. From each block, extract one or a plurality of representative colors and its or their frequencies to obtain a color distribution features A.

Next, convert the frequency distribution features A (DCT coefficient) to a color distribution features B by the following manner.

First, inverse-orthogonal-convert the DCT coefficient of the frequency distribution features A to generate an image of 8×8 pixels. Then, with each pixel of the image having the 8×8 pixels regarded as a block, extract a color of a pixel and its rate (100%) as color constituent information from each block. A set of the extracted color constituent information is referred to as the color distribution features B.

In addition, convert the color distribution features A to a frequency distribution features B (DCT coefficient) by the following manner.

First, obtain a product of a rate of a color frequency and a pixel value of each block with respect to each representative color and assume a total sum to be mean color information. Next, generate an image of 8×8 pixels composed of a mean color of each block. With respect to the generated image of 8×8 pixels, conduct DCT to extract a low-degree coefficient string of a luminance signal and a color difference signal out of the obtained coefficients. Furthermore, convert the obtained DCT coefficient using a conversion table to generate the frequency distribution features B.

With the data size of the frequency distribution features A and the frequency distribution features B and the data size of color distribution features A and the color distribution features B set to be substantially the same, a normalized mean search order is calculated which is obtained when search is conducted using the respective image features.

Table 1 shows a normalized mean search order obtained when using the frequency distribution features as an image features, while Table 2 shows a normalized mean search order obtained when using the color distribution features as an image features.

TABLE 1

| COLOR DISTRIBUTION FEATURES | NORMALIZED MEAN SEARCH ORDER |
| --- | --- |
| A | 0.324813 |
| B | 0.414585 |

TABLE 2

| FREQUENCY DISTRIBUTION FEATURES | NORMALIZED MEAN SEARCH ORDER |
| --- | --- |
| A | 0.209047 |
| B | 0.209288 |

It can be seen from Table 1 that as compared with a case where a color distribution features is generated from an original image, when using a color distribution features generated by the conversion from a frequency distribution features, the normalized mean search order obtains about three-fourths the performance. It can be seen from Table 2 that as compared with a case where a frequency distribution features is generated from an original image, a normalized mean search order when using a frequency distribution features generated as a result of conversion of a color distribution features is substantially coincident to barely have the danger of deteriorating search performance.

It is therefore clear that both the color distribution features and the frequency distribution features can be handled by the same similarity calculation unit and that an image search system whose system structure is simplified without largely deteriorating search performance can be provided.

Furthermore, an image search system can be provided which is capable of conducting search regardless whether a kind of image features is a frequency distribution features or a color distribution features.

Figure 10:
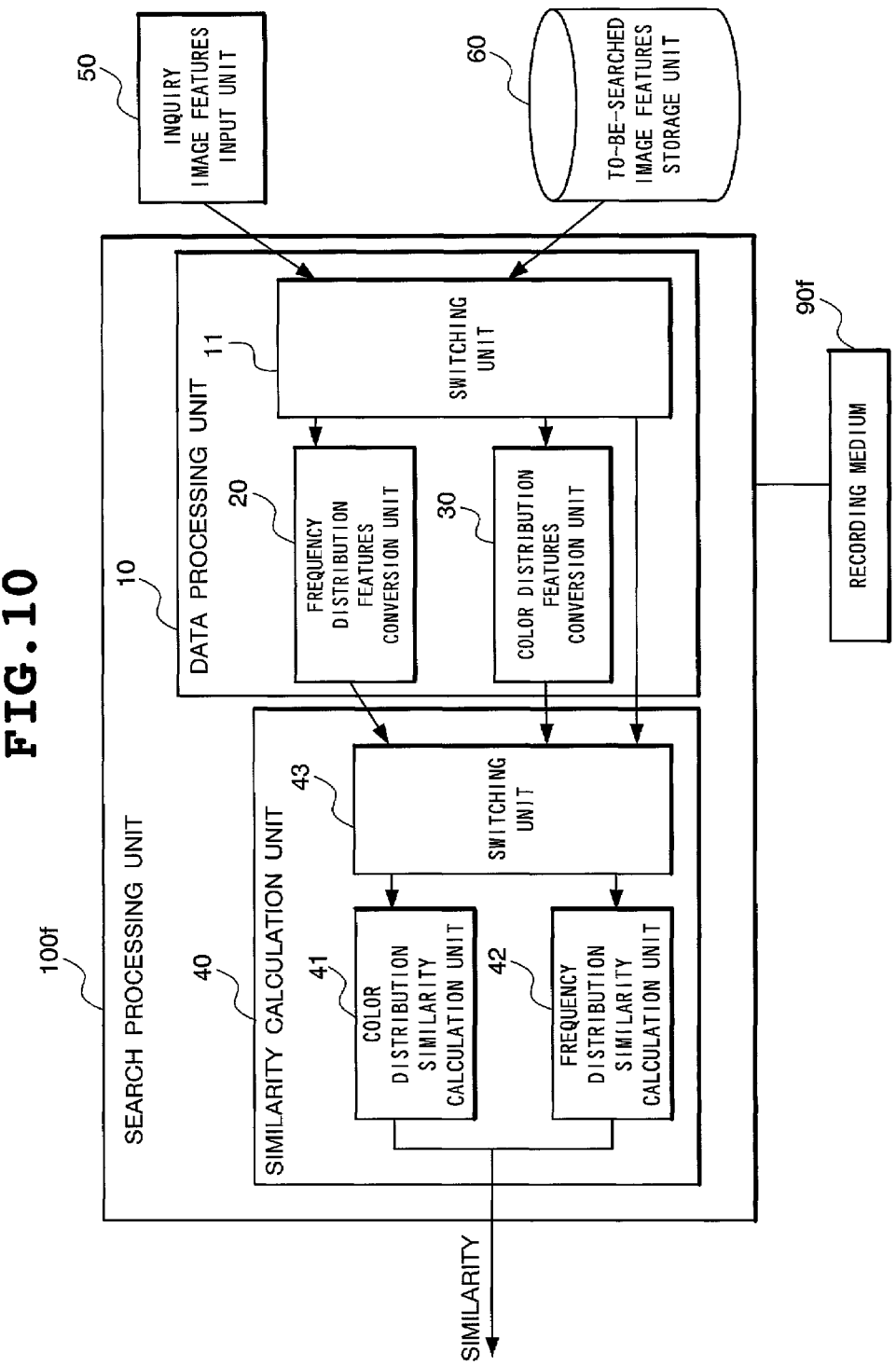
FIG. 10 is a block diagram showing a structure of an image search system according to other embodiment of the present invention.
Figure 11:
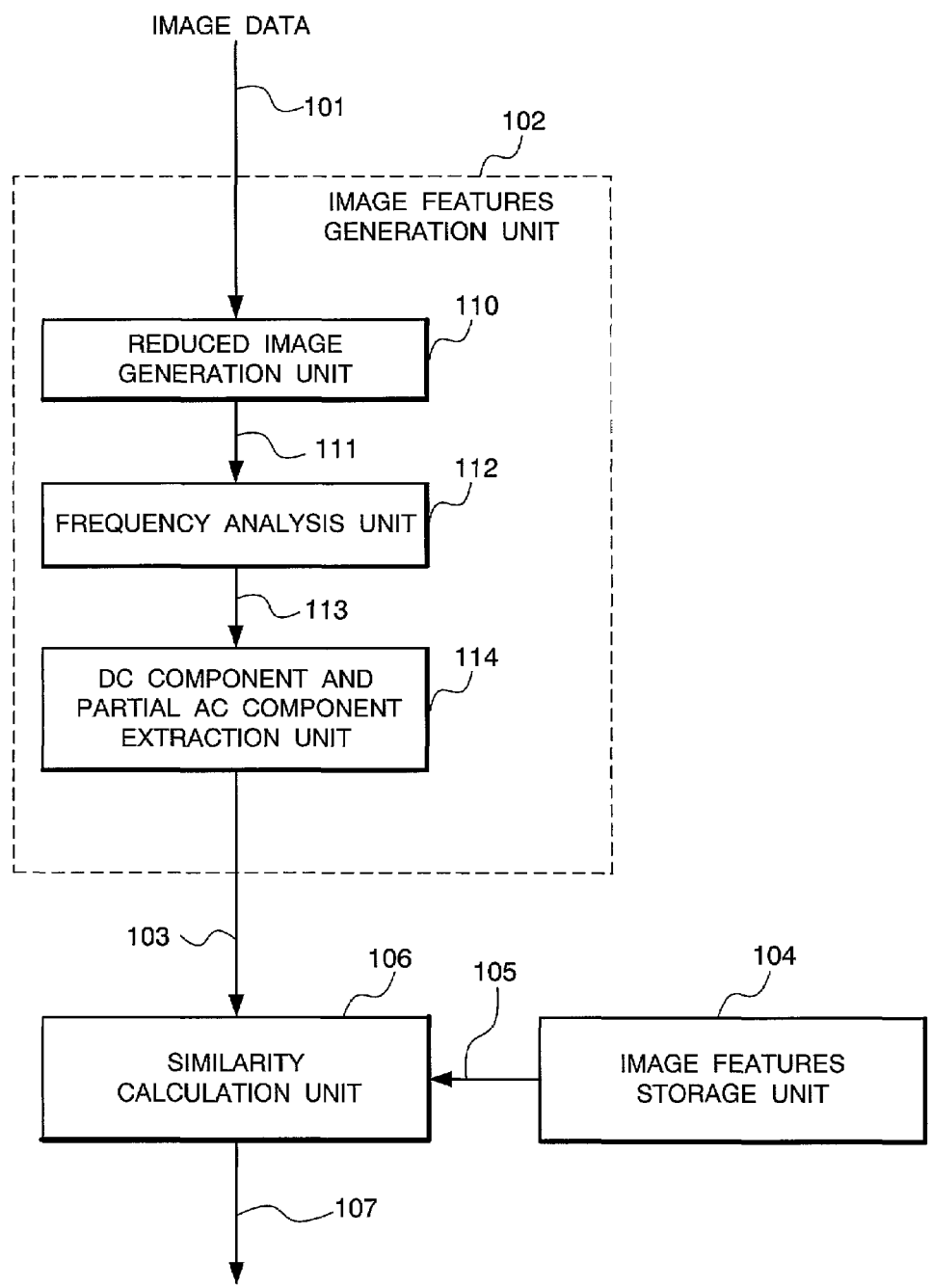
FIG. 11 is a block diagram showing a main part of a structure of a conventional image search system.
Figure 12:
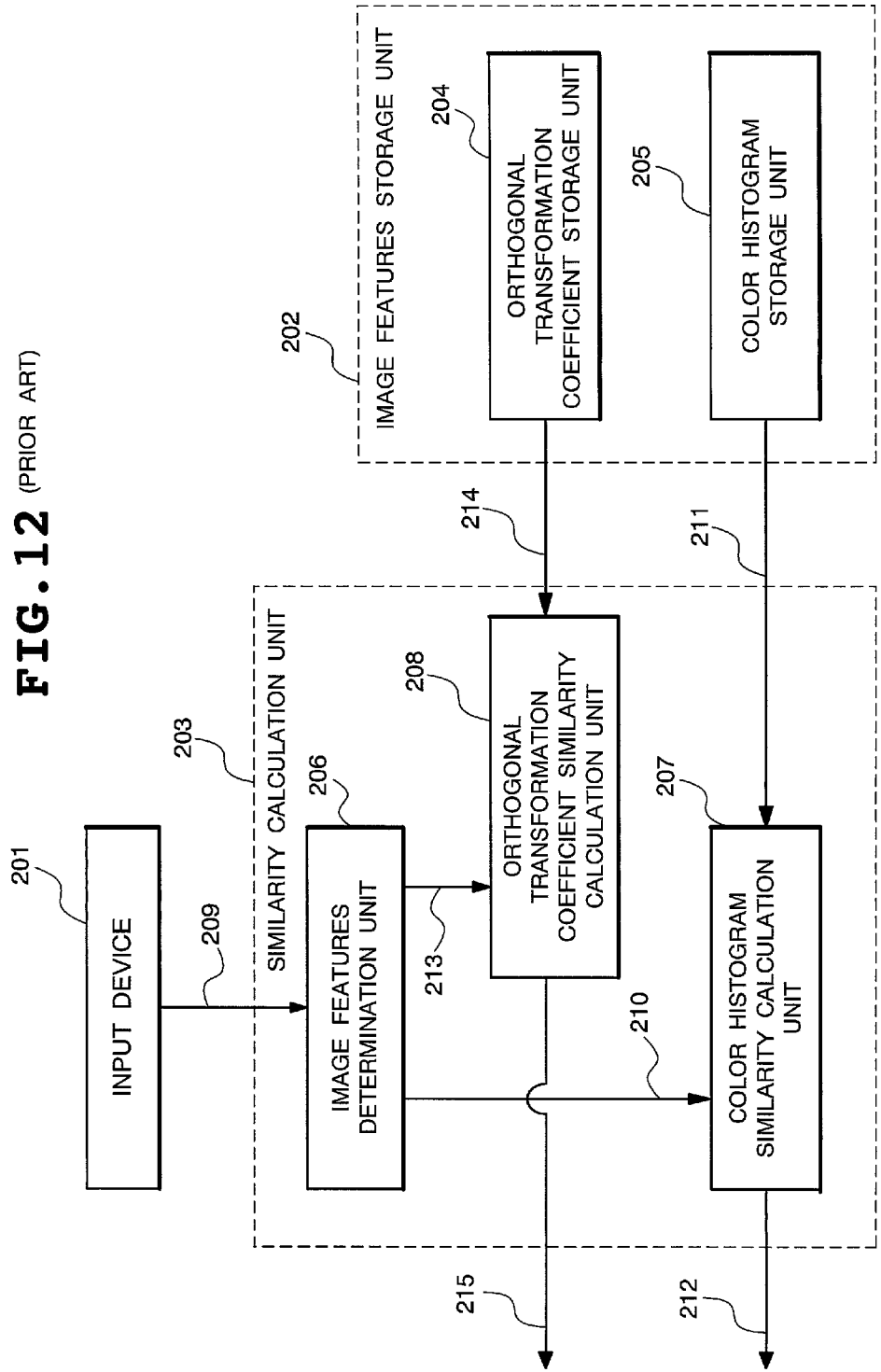
FIG. 12 is a block diagram showing a main part of a structure of a conventional image search system.

FIG. 10 is a block diagram showing a structure of other embodiment of the image search system of the present invention.

In the example of the image search system shown in FIG. 10, a search processing unit 100f receives input of an image features of an inquiry image from an inquiry image features input unit 50 and refers to an to-be-searched image features storage unit 60 for an image features of each image to be searched to determine and output a similarity of the image.

The search processing unit 100f includes a data processing unit 10 for converting a kind of image features and a similarity calculation unit 40 for calculating a similarity.

Here, in the image search system as the example shown in FIG. 10, the data processing unit 10 has both the frequency distribution features conversion unit 20 and the color distribution features conversion unit 30 and also the similarity calculation unit 40 has both the color distribution similarity calculation unit 41 and the frequency distribution similarity calculation unit 42 such that search can be properly conducted in either of a case where image features of an inquiry image and an image to be searched are frequency distribution features and a case where the same is a color distribution features.

The data processing unit 10 then appropriately switches an image features applied from the inquiry image features input unit 50 and an image features obtained with reference to the amount of to-be-searched image features storage unit 60 by means of a switching unit 11 to convert an image features when conversion is required and otherwise transfer the amount to the similarity calculation unit 40 without conversion.

Then, also at the similarity calculation unit 40, the switching unit 43 appropriately switches the image features transferred from the data processing unit 10 and transfers the amount to either one of the color distribution similarity calculation unit 41 and the frequency distribution similarity calculation unit 42 that corresponds to the kind of image features to calculate a similarity and output the same.

Therefore, the image search system of the present embodiment is allowed to freely handle both the color distribution features and the frequency distribution features, whereby an image search system can be provided which is capable of conducting search regardless whether a kind of image features is a color distribution features or a frequency distribution features.

In addition, the above-described image search systems according to the respective embodiments have none of limitation of a kind of color in color constituent information to a specific color space and allows application to various color spaces such as RGB color space, YCbCr color space ad HSV color space.

As a manner of determining a representative color, not all component colors are necessarily added and evened and a method using a mean value of only a part of component colors is possible.

Moreover, each unit such as the feature storage unit or the similarity calculation unit is not necessarily provided in the same device but may be disposed distributedly at a plurality of devices. Also possible is, for example, a mode in which data of an image to be searched is referred to through a communication network.

In the above-described image search systems according to the respective embodiments, the functions of the data processing unit 10, the frequency distribution features conversion units 20 and 20a, the color distribution features conversion units 30 and 30a, the similarity calculation unit 40, the color distribution similarity calculation 41, the frequency distribution similarity calculation unit 42 and the like can be realized not only as hardware but also by loading a computer program having the respective functions into a memory of a computer processing device. The computer program is stored in recording media 90, 90a, 90b, 90c, 90d, 90e and 90f such as a magnetic disc, a semiconductor memory or a CD-ROM. Then, loading the program from the recording medium into the computer processing device to control operation of the computer processing device realizes each of the above-described functions.

Although the present invention has been described and illustrated with respect to the preferred modes and embodiments in the foregoing, the present invention is not limited to the above-described modes and embodiments but can be implemented in variation within a scope of the technical ideas.

As described in the foregoing, according to the image search system of the present invention and the image search method thereof, converting an image features to unify its kind enables an image similar to an inquiry image to be specified from among images to be searched regardless whether a kind of image features used is a frequency distribution features or a color distribution features, while realizing excellent search performance and allows the same similarity determination function to be applied to different kinds of image features, so that the structure of the image search system can be simplified.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the featureet out in the appended claims.

What is claimed is:

1. An image search system for determining a similarity of an image whose features are represented by either one of image features amounts, an amount of color distribution features or an amount of frequency distribution features, to search for a similar image, wherein said amount of color distribution features is set to be an image feature amount obtained by dividing an image as an object representing feature into a predetermined plurality of blocks and determining a representative color of each said block to generate data of said representative color corresponding to each said block; and wherein said amount of frequency distribution features is set to be an image feature amount generated by transforming an image as an object representing features into a reduced image of a fixed size and subjecting said reduced image to frequency conversion, the image search system comprising:

means for transforming, with respect to an image set to be a target whose kind of image feature amount is to be changed among respective images to be searched and an inquiry image, a kind of image feature amount of the target image in question to make kinds of image feature amounts of each said image to be searched and said inquiry image coincident with each other; and means for comparing the image feature amount of said inquiry image with the image feature amount of each said image to be searched based on said transformed image feature amount and determining a similarity of each image to search for a similar image;

frequency distribution feature amount transformation means for transforming an amount of frequency distribution features into an amount of color distribution features indicative of features similar to image features represented by the amount of frequency distribution features in question, and color distribution similarity calculation means for comparing the amount of color distribution features of said inquiry image with the amount of color distribution features of each said image to be searched and determining a similarity of each image to search for a similar image, wherein said frequency distribution features amount transformation means renders all the kinds of image features amounts of each image to be searched and the inquiry image into the amount of color distribution features, and said frequency distribution features amount transformation means including inverse-frequency transformation means for decoding an applied amount of frequency distribution features to generate a decoded image, and color distribution features amount extraction means for extracting each pixel value of said decoded image as an amount of color constituent features to extract an amount of color distribution features indicative of feature similar to image features represented by said applied amount of frequency distribution features.

2. The image search system as set forth in claim 1, further comprising means for referring to data of the image feature amount of each said image to be searched, means for receiving input of data of the image feature amount of said inquiry image.

3. The image search system as set forth in claim 1, wherein said frequency distribution features amount transformation means including image division means for dividing said decoded image into a predetermined plurality of blocks.

4. The image search system as set forth in claim 3, further comprising means for referring to data of the image feature amount of each said image to be searched, means for receiving input of data of the image feature amount of said inquiry image.

5. The image search system as set forth in claim 3, wherein said color distribution feature amount extraction means determines a representative color of each said block obtained by the division by said image division means to extract a set of said representative colors as an amount of color distribution features.

6. The image search system as set forth in claim 5, wherein said color distribution features amount extraction means calculates a color mean of a pixel in each said block obtained by the division by said image division means to determine a color of said calculated color mean as said representative color.

7. An image search system for determining a similarity of an image whose features are represented by either one of image features amounts, an amount of color distribution features or an amount of frequency distribution features, to search for a similar image, wherein said amount of color distribution features is set to be an image feature amount obtained by dividing an image as an object representing feature into a predetermined plurality of blocks and determining a representative color of each said block to generate data of said representative color corresponding to each said block; and wherein said amount of frequency distribution features is set to be an image feature amount generated by transforming an image as an object representing features into a reduced image of a fixed size and subjecting said reduced image to frequency conversion, the image search system comprising:

means for transforming, with respect to an image set to be a target whose kind of image feature amount is to be changed among respective images to be searched and an inquiry image, a kind of image feature amount of the target image in question to make kinds of image feature amounts of each said image to be searched and said inquiry image coincident with each other;

means for comparing the image feature amount of said inquiry image with the image feature amount of each said image to be searched based on said transformed image feature amount and determining a similarity of each image to search for a similar image;

color distribution features amount transformation conversion means for transforming an amount of color distribution features into an amount of frequency distribution features indicative of features similar to image features represented by the color distribution features in question, and frequency distribution similarity calculation means for comparing the amount of frequency distribution features of said inquiry image with the amount of frequency distribution features of each said image to be searched and determining a similarity of each image to search for a similar image, wherein said color distribution features conversion means comprising representative color determination means for determining a representative color of each bock in an applied color distribution features, image generation means for generating an image which uses the representative color of each said block as a pixel, image size change means for changing the size of the image generated by said image generation means to a predetermined size, and frequency distribution features amount extraction means for frequency-converting the image changed by said image size change means to extract an amount of frequency distribution features indicative of feature similar to the image features represented by said applied amount of color distribution features.

8. The image search system as set forth in claim 1, wherein
each said image to be searched is set to be a target whose kind of said image features amount is to be transformed, and
the kind of image feature amount of each said image to be searched is transformed to be coincident with the kind of image features amount of said inquiry image.

9. The image search system as set forth in claim 1, wherein
said inquiry image is set to be a target whose kind of said image features amount is to be transformed, and
the kind of image feature amount of said inquiry image is transformed to be coincident with the kind of image features amount of each said image to be searched.

10. The image search system as set forth in claim 1, wherein
both the images, said inquiry image and said image to be searched, are set to be a target whose kind of said image feature amount is to be transformed, and
the kinds of image features of the respective images, said inquiry image and said each image to be searched, are transformed.

11. The image search system as set forth in claim 10, wherein a circuit for converting a kind of image features amount of said inquiry image and a circuit for converting a kind of image features amount of each said image to be searched are provided independently.

12. The image search system as set forth in claim 1, wherein
said frequency distribution features is set to be an image features amount generated by converting an image as an object representing feature into a reduced image of a fixed size and subjecting said reduced image to frequency transformation and quantization.

13. An image search method of determining a similarity of an image whose features are represented by either one of image features amounts, an amount of color distribution features or an amount of frequency distribution features, to search for a similar image, comprising the steps of:

with respect to an image set to be a target whose kind of image feature amount is to be converted among respective images to be searched and an inquiry image, transforming the kind of image feature amount of the target image in question to make kinds of image feature amounts of each said image to be searched and said inquiry image coincident with each other;

comparing the image feature amount of said inquiry image with the image feature amount of each said image to be searched based on said converted image feature amount and determining a similarity of each image to search for a similar image;

a frequency distribution features amount transformation step of transforming an amount of frequency distribution features into an amount of color distribution features indicative of feature similar to image features represented by the amount of frequency distribution features in question, and a color distribution similarity calculation step of comparing the amount of color distribution features of said inquiry image with the amount of color distribution features of each said image to be searched and determining a similarity of each image to search for a similar image, wherein said frequency distribution features amount transformation step renders all the kinds of image features amounts of each image to be searched and the inquiry image into the amount of color distribution features, and said frequency distribution features amount transformation step including an inverse-frequency transformation step of decoding an applied amount of frequency distribution features to generate a decoded image, and a color distribution features amount extraction step of extracting each pixel value of said decoded image as an amount of color constituent features to extract an amount of color distribution features indicative of feature similar to image features represented by said applied amount of frequency distribution features.

14. The image search method as set forth in claim 13, further comprising
a step of referring to data of the image feature amount of each said image to be searched,
a step of receiving input of data of the image feature amount of said inquiry image.

15. The image search method as set forth in claim 13, wherein
said frequency distribution features amount transformation step including
an image division step of dividing said decoded image into a predetermined plurality of blocks.

16. The image search method as set forth in claim 15, further comprising
a step of referring to data of the image feature amount of each said image to be searched,
a step of receiving input of data of the image feature amount of said inquiry image.

17. The image search method as set forth in claim 15, wherein
said color distribution features amount extraction step determines
a representative color of each said block obtained by the division by said image division step to extract a set of said representative colors as an amount of color distribution features.

18. The image search method as set forth in claim 17, wherein
said color distribution features amount extraction step calculates a color mean of a pixel in each said block obtained by the division by said image division step to determine a color of said calculated color mean as said representative color.

19. An image search method of determining a similarity of an image whose features are represented by either one of image features amounts, an amount of color distribution features or an amount of frequency distribution features, to search for a similar image, comprising the steps of:
with respect to an image set to be a target whose kind of image feature amount is to be converted among respective images to be searched and an inquiry image, transforming the kind of image feature amount of the target image in question to make kinds of image feature amounts of each said image to be searched and said inquiry image coincident with each other;
comparing the image feature amount of said inquiry image with the image feature amount of each said image to be searched based on said converted image feature amount and determining a similarity of each image to search for a similar image;
a color distribution features amount transformation step of transforming an amount of a color distribution features into an amount of frequency distribution features indicative of feature similar to image features represented by the amount of color distribution features in question, and
a frequency distribution similarity calculation step of comparing the amount of the frequency distribution features of said inquiry image with the amount of the frequency distribution features of each said image to be searched and determining a similarity of each image to search for a similar image, wherein
said color distribution features amount transformation step renders all the kinds of image features amounts of each image to be searched and the inquiry image into the amount of frequency distribution features
said color distribution features amount transformation step comprising
a representative color determination step of determining a representative color of each bock in an applied color distribution features,
an image generation step of generating an image which uses the representative color of each said block as a pixel,
an image size change step of changing the size of the image generated by said image generation step to a predetermined size, and
a frequency distribution features extraction step of frequency-converting the image changed by said image size change step to extract an amount of frequency distribution features indicative of feature similar to the image features represented by said applied amount of color distribution features.

20. A computer-readable medium tangibly embodying an image search program for determining a similarity of an image whose features are represented by either one of image features amounts, an amount of color distribution features or an amount of frequency distribution features, to search for a similar image by controlling a computer, the program comprising the functions of:
with respect to an image set to be a target whose kind of image feature amount is to be converted among respective images to be searched and an inquiry image, transforming the kind of image feature amounts of the target image in question to make kinds of image feature amounts of each said image to be searched and said inquiry image coincident with each other; and
comparing the image feature amount of said inquiry image with the image feature amount of each said image to be searched based on said converted image feature amount and determining a similarity of each image to search for a similar image;
a frequency distribution features amount transformation function of transforming an amount of frequency distribution features into an amount of color distribution features indicative of feature similar to image features represented by the amount of frequency distribution features in question, and
a color distribution similarity calculation function of comparing the amount of color distribution features of said inquiry image with the amount of color distribution features of each said image to be searched and determining a similarity of each image to search for a similar image, wherein
said frequency distribution features amount transformation function renders all the kinds of image features amounts of each image to be searched and the inquiry image into the amount of color distribution features, and said frequency distribution features amount transformation function including
an inverse-frequency transformation function of decoding an applied amount of frequency distribution features to generate a decoded image, and
a color distribution features amount extraction function of extracting each pixel value of said decoded image as an amount of color constituent features to extract an amount of color distribution features indicative of feature similar to image features represented by said applied amount of frequency distribution features.

21. The computer-readable medium set forth in claim 20, further comprising
a function of referring to data of the image feature amount of each said image to be searched,
a function of receiving input of data of the image feature amount of said inquiry image.

22. A computer-readable medium tangably embodying an image search program for determining a similarity of an image whose features are represented by either one of image feature amounts, an amount of color distribution features or an amount of frequency distribution features, to search for a similar image by controlling a computer, the program comprising the functions of:
with respect to an image set to be a target whose kind of image feature amount is to be converted among respective images to be searched and an inquiry image, transforming the kind of image feature amount of the target image in question to make kinds of image feature amounts of each said image to be searched and said inquiry image coincident with each other;
comparing the image feature amount of said inquiry image with the image feature amount of each said image to be searched based on said converted image feature amount and determining a similarity of each image to search for a similar image;

a color distribution features amount transformation function of transforming an amount of a color distribution features into an amount of frequency distribution features indicative of feature similar to image features represented by the amount of color distribution features in question, and
a frequency distribution similarity calculation function of comparing the amount of frequency distribution features of said inquiry image with the amount of the frequency distribution features of each said image to be searched and determining a similarity of each image to search for a similar image, wherein
said color distribution features amount transformation function renders all the kinds of image features amounts of each image to be searched and the inquiry image into the amount of frequency distribution features,
said color distribution features amount transformation function comprising
a representative color determination function of determining a representative color of each bock in an applied color distribution features,
an image generation function of generating an image which uses the representative color of each said block as a pixel,
an image size change function of changing the size of the image generated by said image generation function to a predetermined size, and
a frequency distribution features extraction function of frequency-converting the image changed by said image size change function to extract an amount of frequency distribution features indicative of feature similar to the image features represented by said applied amount of color distribution features.

* * * * *